(12) United States Patent  
Sano et al.

(10) Patent No.: US 12,031,301 B2
(45) Date of Patent: Jul. 9, 2024

(54) SHOVEL AND WORK SUPPORT SYSTEM FOR CONSTRUCTION MACHINE

(71) Applicant: SUMITOMO HEAVY INDUSTRIES, LTD., Tokyo (JP)

(72) Inventors: Yusuke Sano, Kanagawa (JP); Chunnan Wu, Kanagawa (JP); Yoshiyasu Itsuji, Kanagawa (JP); Koichiro Tsukane, Kanagawa (JP); Takumi Itoh, Kanagawa (JP); Keiji Honda, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/175,952

(22) Filed: Feb. 28, 2023

(65) Prior Publication Data

US 2023/0203790 A1 Jun. 29, 2023

Related U.S. Application Data

(63) Continuation of application No. 16/562,637, filed on Sep. 6, 2019, now Pat. No. 11,613,873, which is a
(Continued)

(30) Foreign Application Priority Data

Mar. 7, 2017 (JP) .................................. 2017-043248
Mar. 27, 2017 (JP) .................................. 2017-061957

(51) Int. Cl.
*E02F 9/26* (2006.01)
*E02F 3/32* (2006.01)
(Continued)

(52) U.S. Cl.
CPC ................ *E02F 9/261* (2013.01); *E02F 3/32* (2013.01); *E02F 9/02* (2013.01); *E02F 9/0833* (2013.01);
(Continued)

(58) Field of Classification Search
CPC ..... E02F 9/261; E02F 3/32; E02F 9/02; E02F 9/0833; G06T 7/593; G06T 2207/10012;
(Continued)

(56) References Cited

U.S. PATENT DOCUMENTS 8,289,191 B2 * 10/2012 Larcher .................. B64D 47/02
356/615
8,698,612 B2 * 4/2014 Toll ......................... B60Q 1/50
340/463
(Continued)

FOREIGN PATENT DOCUMENTS

| JP | H02-008847 U | 3/1990 |
| JP | H05-014906 U | 4/1993 |

(Continued)

OTHER PUBLICATIONS

Construction Machinery and Equipment, Issue 6, Jun. 1, 2015, vol. 51, No. 6, the back cover, ISSN 0385-9878 and Written Opinion for PCT/JP2018/008724 as the concise explanation of relevance with partial English translation.
(Continued)

*Primary Examiner* — Matthew David Kim
(74) *Attorney, Agent, or Firm* — IPUSA, PLLC

(57) ABSTRACT

A shovel includes a lower traveling body, an upper turning body turnably mounted on the lower traveling body, and a controller configured to control a projection device that projects light onto a ground surface. The controller is attached to the upper turning body, and is configured to control the projection device so as to enable visualization of
(Continued)

the relationship between the current shape of the ground surface and the shape of a target surface.

10 Claims, 23 Drawing Sheets

Related U.S. Application Data continuation of application No. PCT/JP2018/008724, filed on Mar. 7, 2018.

(51) Int. Cl.
*E02F 9/02* (2006.01)
*E02F 9/08* (2006.01)
*G06T 7/593* (2017.01)
*H04N 13/204* (2018.01)

(52) U.S. Cl.
CPC ........... *G06T 7/593* (2017.01); *H04N 13/204* (2018.05); *G06T 2207/10012* (2013.01); *G06T 2207/10024* (2013.01); *G06T 2207/30252* (2013.01)

(58) Field of Classification Search
CPC ........... G06T 2207/10024; G06T 2207/30252; H04N 13/204
USPC .......................................................... 348/46
See application file for complete search history.

(56) References Cited

U.S. PATENT DOCUMENTS

| | | | |
|---|---|---|---|
| 8,942,895 B2 | 1/2015 | Nomura et al. | |
| 9,567,102 B1* | 2/2017 | Ross | G01C 21/365 |
| 9,824,490 B1 | 11/2017 | Cote et al. | |
| 9,969,325 B2* | 5/2018 | Lection | B60Q 1/545 |
| 2003/0004645 A1 | 1/2003 | Kochi | |
| 2009/0010713 A1 | 1/2009 | Kotting et al. | |
| 2013/0187785 A1* | 7/2013 | McIntosh | F16P 3/144 340/686.6 |
| 2013/0261891 A1 | 10/2013 | Kim et al. | |
| 2014/0247432 A1* | 9/2014 | Yanase | H05B 47/23 315/122 |
| 2014/0267731 A1 | 9/2014 | Izumikawa | |
| 2014/0300464 A1* | 10/2014 | Chen | B60Q 1/323 340/471 |
| 2016/0002884 A1 | 1/2016 | Nakamura | |
| 2016/0326724 A1* | 11/2016 | Hartman | H05B 47/115 |
| 2017/0099473 A1 | 4/2017 | Nakaguchi | |
| 2017/0175364 A1 | 6/2017 | Hasegawa et al. | |
| 2017/0210282 A1* | 7/2017 | Rodriguez Barros | B60Q 1/324 |
| 2017/0259734 A1* | 9/2017 | Imaishi | B60Q 1/535 |
| 2018/0009547 A1* | 1/2018 | Brewer | B64D 33/04 |
| 2018/0051446 A1 | 2/2018 | Yoshinada et al. | |
| 2019/0161943 A1* | 5/2019 | Frank | E02F 9/24 |

FOREIGN PATENT DOCUMENTS

| | | |
|---|---|---|
| JP | H06-071545 U | 10/1994 |
| JP | 2583666 U | 10/1998 |
| JP | 2002-352224 | 12/2002 |
| JP | 2003-213733 | 7/2003 |
| JP | 2004-352102 | 12/2004 |
| JP | 2006-176087 | 7/2006 |
| JP | 2007-236243 | 9/2007 |
| JP | 2007-315129 | 12/2007 |
| JP | 2008-033071 | 2/2008 |
| JP | 2009-013777 | 1/2009 |
| JP | 2010-018141 | 1/2010 |
| JP | 2012-172425 | 9/2012 |
| JP | 2016-137860 | 8/2016 |
| JP | 2016-160741 | 9/2016 |
| WO | 2014/125640 | 8/2014 |
| WO | 2015/141080 | 9/2015 |
| WO | 2016/079557 | 5/2016 |
| WO | 2016/111148 | 7/2016 |

OTHER PUBLICATIONS

Construction Machinery and Equipment, Issue 9, Sep. 1, 2015, vol. 51, No. 9, the front cover, ISSN 0385-9878 and Written Opinion for PCT/JP2018/008724 as the concise explanation of relevance with partial English translation.
International Search Report for PCT/JP2018/008724 mailed on May 15, 2018.
Partial supplementary European search report for 18763416.7 mailed on Feb. 26, 2020.

* cited by examiner

SHOVEL AND WORK SUPPORT SYSTEM FOR CONSTRUCTION MACHINE

CROSS-REFERENCE TO RELATED APPLICATIONS

The present application is a continuation of U.S. patent application Ser. No. 16/562,637, filed on Sep. 6, 2019, which is a continuation application filed under 35 U.S.C. 111(a) claiming benefit under 35 U.S.C. 120 and 365(c) of PCT International Application No. PCT/JP2018/008724, filed on Mar. 7, 2018, which claims priority to Japanese Patent Application No. 2017-043248, filed on Mar. 7, 2017, and Japanese Patent Application No. 2017-061957, filed on Mar. 27, 2017. The entire contents of the foregoing applications are incorporated herein by reference.

BACKGROUND

Technical Field

The disclosures herein generally relate to a shovel and a work support system for a construction machine.

Description of Related Art

A shovel serving as a construction machine that supports an operator's excavation work is known, in which a value indicating a distance between a target surface and the edge of a bucket is displayed on a monitor. The target surface refers to a target ground surface obtained after the excavation work is successfully completed, and is typically located below the current ground surface.

The monitor is provided near the operator within the cabin. Therefore, when performing the excavation work, the operator operates an operation lever while checking a value displayed on the monitor within the cabin.

However, in order to check the monitor, the operator needs to temporarily look away from the edge of the bucket, which may result in interruption of the excavation work performed by the operator who operates the operation lever. Further, workers in the vicinity of the shovel are unable to check information monitored by the construction machine. Accordingly, in the above-described shovel, the efficiency of excavation work may decrease.

SUMMARY

According to an embodiment of the present invention, a shovel includes a lower traveling body, an upper turning body turnably mounted on the lower traveling body, and a controller configured to control a projection device that projects light onto a ground surface. The controller is attached to the upper turning body, and is configured to control the projection device so as to enable visualization of the relationship between the current shape of the ground surface and the shape of a target surface.

According to an embodiment of the present invention, a shovel includes a crawler-type lower traveling body, an upper turning body mounted on the lower traveling body, an attachment attached to the upper turning body, and a step attached to a frame of the lower traveling body and fitting within a width of a crawler belt of the lower traveling body. A color of the step is different in any or all of hue, lightness, and chroma from a color of the frame.

According to an embodiment of the present invention, a work support system for a construction machine configured to project light in vicinity of the construction machine is provided. The work support system includes a controller, and a projection device configured to change information visualized on a ground surface in the vicinity of the construction machine, based on a signal from the controller.

Other objects and further features of the present invention will be apparent from the following detailed description when read in conjunction with the accompanying drawings.

DETAILED DESCRIPTION

It is desirable to provide a shovel that supports an operator or workers in the vicinity of the shovel without decreasing work efficiency.

Figure 1:
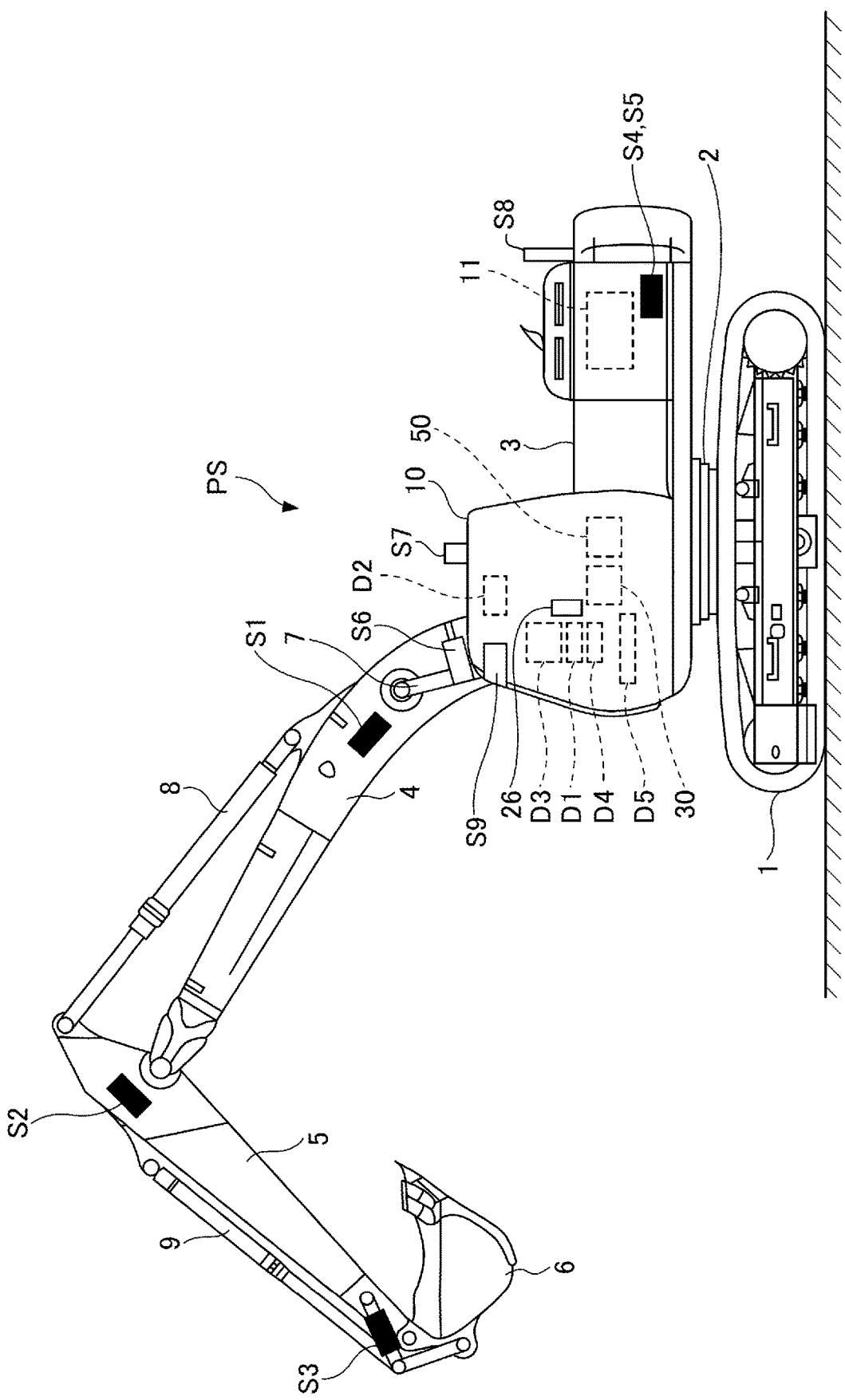
FIG. 1 is a side view of a shovel.

FIG. 1 is a side view of a shovel (an excavator) according to an embodiment of the present invention. An upper turning body 3 is turnably mounted on a lower traveling body 1 of the shovel via a turning mechanism 2. A boom 4 is attached to the upper turning body 3. An arm 5 is attached to the end of the boom 4, and a bucket 6 serving as an end attachment is attached to the end of the arm 5. As the end attachment, a slope bucket or a dredging bucket may be used.

The boom 4, the arm 5, and the bucket 6 constitute an excavation attachment, which is an example of an attachment, and are hydraulically driven by a boom cylinder 7, an arm cylinder 8, and a bucket cylinder 9, respectively. A boom angle sensor S1 is attached to the boom 4, an arm angle sensor S2 is attached to the arm 5, and a bucket angle sensor S3 is attached to the bucket 6. The excavation attachment may have a bucket tilt mechanism.

The boom angle sensor S1 detects the rotation angle of the boom 4. In the present embodiment, the boom angle sensor S1 is, for example, an acceleration sensor that detects the rotation angle of the boom 4 relative to the upper turning body 3 by detecting the inclination of the boom 4 relative to a horizontal plane.

The arm angle sensor S2 detects the rotation angle of the arm 5. In the present embodiment, the arm angle sensor S2 is, for example, an acceleration sensor that detects the rotation angle of the arm 5 relative to the boom 4 by detecting the inclination of the arm 5 relative to a horizontal plane.

The bucket angle sensor S3 detects the rotation angle of the bucket 6. In the present embodiment, the bucket angle sensor S3 is, for example, an acceleration sensor that detects the rotation angle of the bucket 6 relative to the arm 5 by detecting the inclination of the bucket 6 relative to a horizontal plane. If the excavation attachment has the bucket tilt mechanism, the bucket angle sensor S3 additionally detects the rotation angle of the bucket 6 around the tilt axis. The boom angle sensor S1, the arm angle sensor S2, and the bucket angle sensor S3, which are orientation sensors of the attachment, may each be a potentiometer using a variable resistor, a stroke sensor that detects the amount of stroke of a corresponding hydraulic cylinder, or a rotary encoder that detects the rotation angle around a connecting pin.

A cabin 10 is mounted on the upper turning body 3. An operation device 26, which serves as a driving and operating unit, is provided within the cabin 10. Further, the upper turning body 3 includes a power source such as an engine 11. Further, a body inclination sensor S4 and a turning angular velocity sensor S5 are attached to the upper turning body 3. Further, a stereo camera S6, a communication device S7, a positioning device S8, and a projection device S9 are attached to the cabin 10. The projection device S9 may be installed at another position, such as a tool box located at the right front of the upper turning body 3. If the projection device S9 is installed in the tool box located at the right front of the upper turning body 3, the projection device S9 projects light through a slit formed on the cover of the tool box. As the tool box is lockable, a theft prevention effect can also be provided. Note that a plurality of projection devices S9 may be attached to the shovel.

The body inclination sensor S4 detects the inclination of the upper turning body 3 relative to the horizontal plane. In the present embodiment, the body inclination sensor S4 is a two-axis acceleration sensor that detects the inclination angle around a front-back axis and a right-left axis of the upper turning body 3. For example, the front-back axis and the right-left axis of the upper turning body 3 are orthogonal to each other and pass through the center point of the shovel, which is a point on a turning axis of the shovel.

The turning angular velocity sensor S5 detects the turning angular velocity of the upper turning body 3. The turning angular velocity sensor S5 is, for example, a gyro sensor. The turning angular velocity sensor S5 may be a resolver or a rotary encoder.

The stereo camera S6 is an imaging device that can take stereo images in the vicinity of the shovel. In the present embodiment, the stereo camera S6 is attached to the upper portion of the front side (moving direction side) of the cabin 10. The stereo camera S6 may be a monocular camera. In this case, the stereo camera S6 uses, as a stereo pair of images, two camera images captured from slightly different positions. The imaging position can be moved by turning the upper turning body 3, for example, and is measured by using a gyro sensor, a global navigation satellite system (GNSS), or the like.

The communication device S7 is a device that controls communication between the shovel and the outside. For example, the communication device S7 controls wireless communication between a positioning system, such as a GNSS, and the shovel. By using the communication device S7, the shovel can obtain design data including information on a target surface via wireless communication. Note that the shovel may use a semiconductor memory to obtain design data.

The positioning device S8 is a device that measures the position and the direction of the shovel. In the present embodiment, the positioning device S8 is a GNSS receiver having an electronic compass. The positioning device S8 measures the latitude, the longitude, and the altitude of the position of the shovel, and also measures the direction of the shovel.

The projection device S9 is a device that projects light onto the ground surface. The projection device S9 may be a liquid crystal display projector for 3D projection mapping or a Digital Light Processing (DLP) (registered trademark) projector. In the present embodiment, the projection device S9 is a DLP (registered trademark) projector with 1024×768 pixel resolution. The resolution of the projection device S9 may be set higher or lower than 1024×768.

Further, an input device D1, an audio output device D2, a display device D3, a storage device D4, a gate lock lever D5, a controller 30, and a machine guidance device 50 are provided within the cabin 10.

The controller 30 functions as a controller that controls the driving of the shovel. In the present embodiment, the controller 30 is configured by an arithmetic processing unit including a CPU and an internal memory. Various functions of the controller 30 are implemented by causing the CPU to execute programs stored in the internal memory.

The machine guidance device 50 is a controller that guides the operation of the shovel. In the present embodiment, for example, the machine guidance device 50 visually and audibly indicates, to the operator, the distance between a target surface set by the operator and the edge (tip) of the bucket 6. Accordingly, the machine guidance device 50 can guide the operator through the operation of the shovel. Note that the machine guidance device 50 may only visually indicate the distance to the operator, or may only audibly indicate the distance to the operator. Similar to the controller 30, the machine guidance device 50 is configured by an arithmetic processing unit including a CPU and an internal memory. Various functions of the machine guidance device 50 are implemented by causing the CPU to execute programs stored in the internal memory. Further, the machine guidance device 50 may control the projection device S9 to irradiate points on the current ground surface with light having colors. The colors are set in accordance with the vertical distances between the points on the ground surface and corresponding points on a target surface. The machine guidance device 50 may be provided separately from the controller 30, or may be incorporated into the controller 30.

The input device D1 is a device used by the operator of the shovel to input various types of information into the machine guidance device 50. In the present embodiment, the input device D1 is a membrane switch attached to the display device D3. A touch panel may be used as the input device D1.

The audio output device D2 outputs audio information in response to an audio output command from the machine guidance device 50. In the present embodiment, the audio output device D2 is an in-vehicle speaker directly connected to the machine guidance device 50. Note that the audio output device D2 may be an alarm such as a buzzer.

The display device D3 displays image information in response to a command from the machine guidance device 50. In the present embodiment, the display device D3 is a liquid crystal display directly connected to the machine guidance device 50.

The storage device D4 is a device that stores various types of information. In the present embodiment, the storage device D4 is a non-volatile storage medium such as a semiconductor memory. The storage device D4 stores various types of information output from devices such as the machine guidance device 50.

The gate lock lever D5 is a mechanism that prevents the shovel from being erroneously operated. In the present embodiment, the gate lock lever D5 is disposed between the door of the cabin 10 and the operator's seat. When the gate lock lever D5 is pulled up such that the operator is unable to exit the cabin 10, various types of operation devices become operable. Conversely, when the gate lock lever D5 is pushed down such that the operator is able to exit the cabin 10, the various types of operation devices become inoperable.

Figure 2:
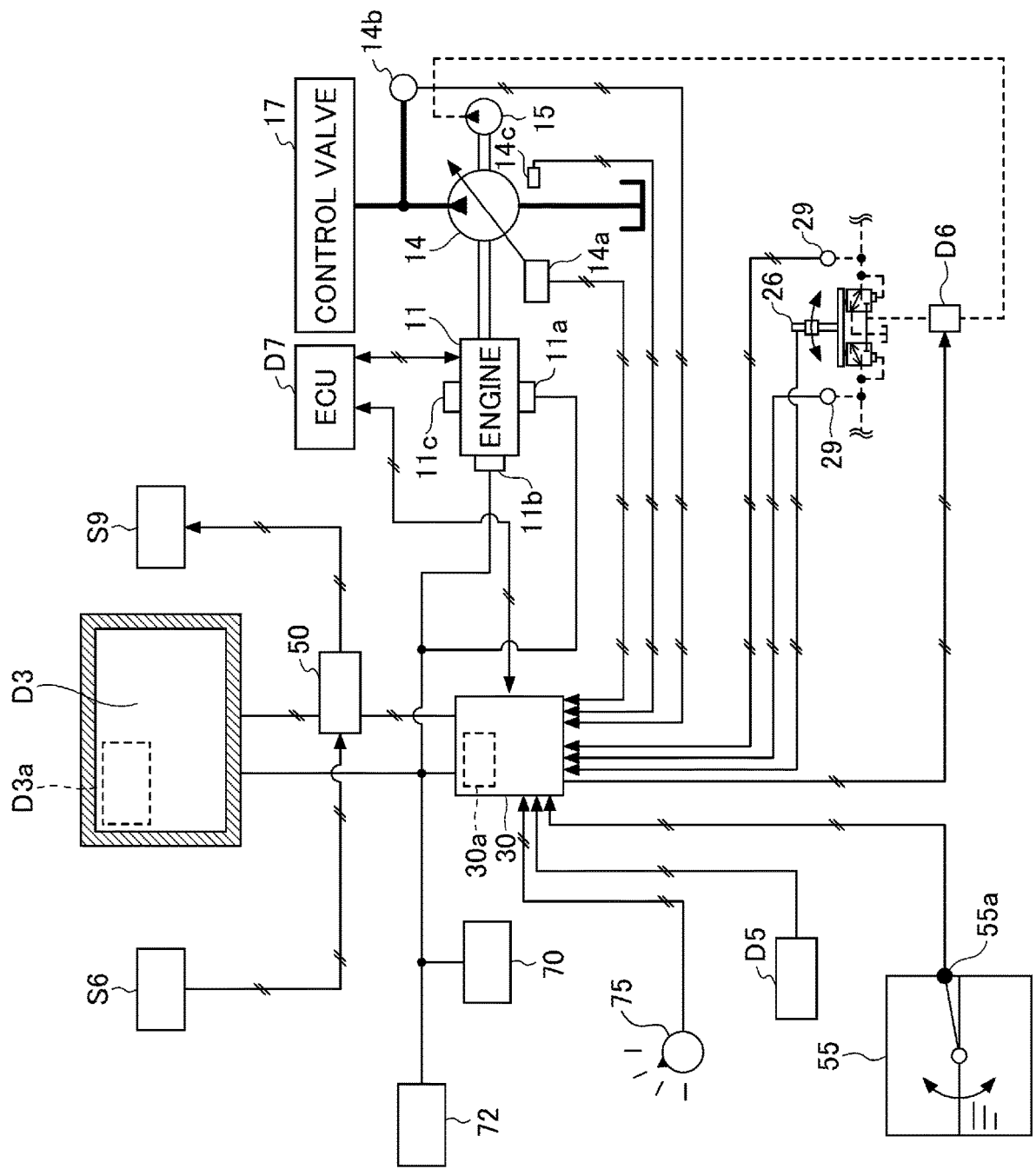
FIG. 2 is a diagram illustrating an example of a configuration of a drive system of the shovel of FIG. 1.

FIG. 2 is a diagram illustrating an example of a configuration of a drive system of the shovel of FIG. 1. In FIG. 2, a mechanical power transmission system is indicated by a double line, a hydraulic oil line is indicated by a thick continuous line, a pilot line is indicated by a dashed line, and an electric drive and control system is indicated by a thin continuous line.

The engine 11 is a power source of the shovel. In the present embodiment, the engine 11 is a diesel engine employing isochronous control that maintains a constant engine rotational speed, regardless of an increase or a decrease in the engine load. An engine controller unit (ECU) D7 controls the fuel injection amount, the fuel injection timing, and the boost pressure in the engine 11.

A main pump 14 and a pilot pump 15, which are hydraulic pumps, are connected to the engine 11. A control valve 17 is connected to the main pump 14 via a hydraulic oil line.

The control valve 17 is a hydraulic controller that controls the hydraulic system of the shovel. Hydraulic actuators such as a right-side traveling hydraulic motor, a left-side traveling hydraulic motor, the boom cylinder 7, the arm cylinder 8, the bucket cylinder 9, and a turning hydraulic motor are connected to the control valve 17 via high pressure hydraulic oil lines. A boom cylinder pressure sensor that detects a load applied to the boom cylinder 7, an arm cylinder pressure sensor that detects a load applied to the arm cylinder 8, and a bucket cylinder pressure sensor that detects a load applied to the bucket cylinder 9 are installed in respective hydraulic oil lines that connect the boom cylinder 7, the arm cylinder 8, and the bucket cylinder 9 to the control valve 17. Further, a turning pressure sensor is installed in a hydraulic oil line connecting the turning hydraulic motor to the control valve 17. Note that the turning hydraulic motor may be a turning motor-generator.

The operation device 26 is connected to the pilot pump 15 via a pilot line and a gate lock valve D6. The operation device 26 includes a lever and a pedal.

The gate lock valve D6 switches communication/shutoff of the pilot line that connects the pilot pump 15 to the operation device 26. In the present embodiment, the gate lock valve D6 is a solenoid valve that switches communication/shutoff of the pilot line in accordance with a command from the controller 30. The controller 30 determines the state of the gate lock lever D5 based on a state signal output from the gate lock lever D5. When the controller 30 determines that the gate lock lever D5 is pulled up, the controller 30 outputs a communication command to the gate lock valve D6. In response to the communication command, the gate lock valve D6 is opened to enable communication of the pilot line. As a result, the operation of the operation device 26 by the operator is enabled. Conversely, when the controller 30 determines that the gate lock lever D5 is pushed down, the controller 30 outputs a shutoff command to the gate lock valve D6. In response to the shutoff command, the gate lock valve D6 is closed such that the pilot line is shut off. As a result, the operation of the operation device 26 by the operator is disabled.

A pressure sensor 29 detects an operation of the operation device 26 in the form of pressure. The pressure sensor 29 outputs a detection value to the controller 30.

In addition, FIG. 2 illustrates a connection relationship between the controller 30 and the display device D3. In the present embodiment, the display device D3 is connected to the controller 30 via the machine guidance device 50. Note that the display device D3, the machine guidance device 50, and the controller 30 may be connected via a communication network such as a controller area network (CAN) or via a dedicated line.

The display device D3 includes a conversion processing unit D3a that generates images. In the present embodiment, the conversion processing unit D3a generates camera images for display, based on information output from the stereo camera S6, which is connected to the machine guidance device 50. Therefore, the display device D3 obtains information output from the stereo camera S6 via the machine guidance device 50. Note that the stereo camera S6 may be connected to the display device D3, or may be connected to the controller 30.

The conversion processing unit D3a generates images for display, based on information output from the controller 30 or the machine guidance device 50. In the present embodiment, the conversion processing unit D3a converts various types of information, output from the controller 30 or the machine guidance device 50, into image signals. Information output from the controller 30 includes data indicating the temperature of engine cooling water, data indicating the temperature of hydraulic oil, and data indicating the remaining amount of fuel. Information output from the machine guidance device 50 includes data indicating the tip position of the bucket 6, the direction of a slope face to be formed, data indicating the direction of the shovel, and data indicating the operation direction to enable the shovel to face the slope face.

The conversion processing unit D3a is not required to serve as a function included in the display device D3, and may serve as a function included in the controller 30 or the machine guidance device 50.

The display device D3 operates by receiving power supply from a storage battery 70. The storage battery 70 is charged by power generated by an alternator 11a (an electric generator) of the engine 11. The power of the storage battery 70 is supplied not only to the controller 30 and the display device D3, but also to an electrical component 72 of the shovel. A starter 11b of the engine 11 is driven by power from the storage battery 70 and starts the engine 11.

The engine 11 is controlled by the engine controller unit D7. The engine controller unit D7 transmits various types of data indicating the state of the engine 11 to the controller 30.

The various types of data include the temperature of cooling water detected by a water temperature sensor 11c. The controller 30 stores such data in a temporary storage (memory) 30a, and transmits the data to the display device D3 when necessary.

Further, various types of data are transmitted to the controller 30, and are stored in the temporary storage 30a. For example, a regulator 14a of the main pump 14, which is a variable volume hydraulic pump, transmits data on a swash plate tilt angle to the controller 30. A discharge pressure sensor 14b transmits data on the discharge pressure of the main pump 14 to the controller 30. An oil temperature sensor 14c transmits, to the controller 30, data on the temperature of hydraulic oil that flows in a pipe line between the main pump 14 and a tank storing the hydraulic oil taken in by the main pump 14. A fuel remaining amount sensor 55a provided in a fuel tank 55 transmits data on the remaining amount of fuel to the controller 30. The pressure sensor 29 transmits, to the controller 30, data on pilot pressure applied to the control valve 17 when the operation device 26 is operated.

In the present embodiment, as illustrated in FIG. 2, the shovel includes an engine rotational speed adjustment dial 75 within the cabin 10. The engine rotational speed adjustment dial 75 is a dial for adjusting the rotational speed of the engine 11. In the present embodiment, the rotational speed of the engine can be switched between four levels. The engine rotational speed adjustment dial 75 transmits data indicating the setting state of the rotational speed of the engine to the controller 30.

Figure 3:
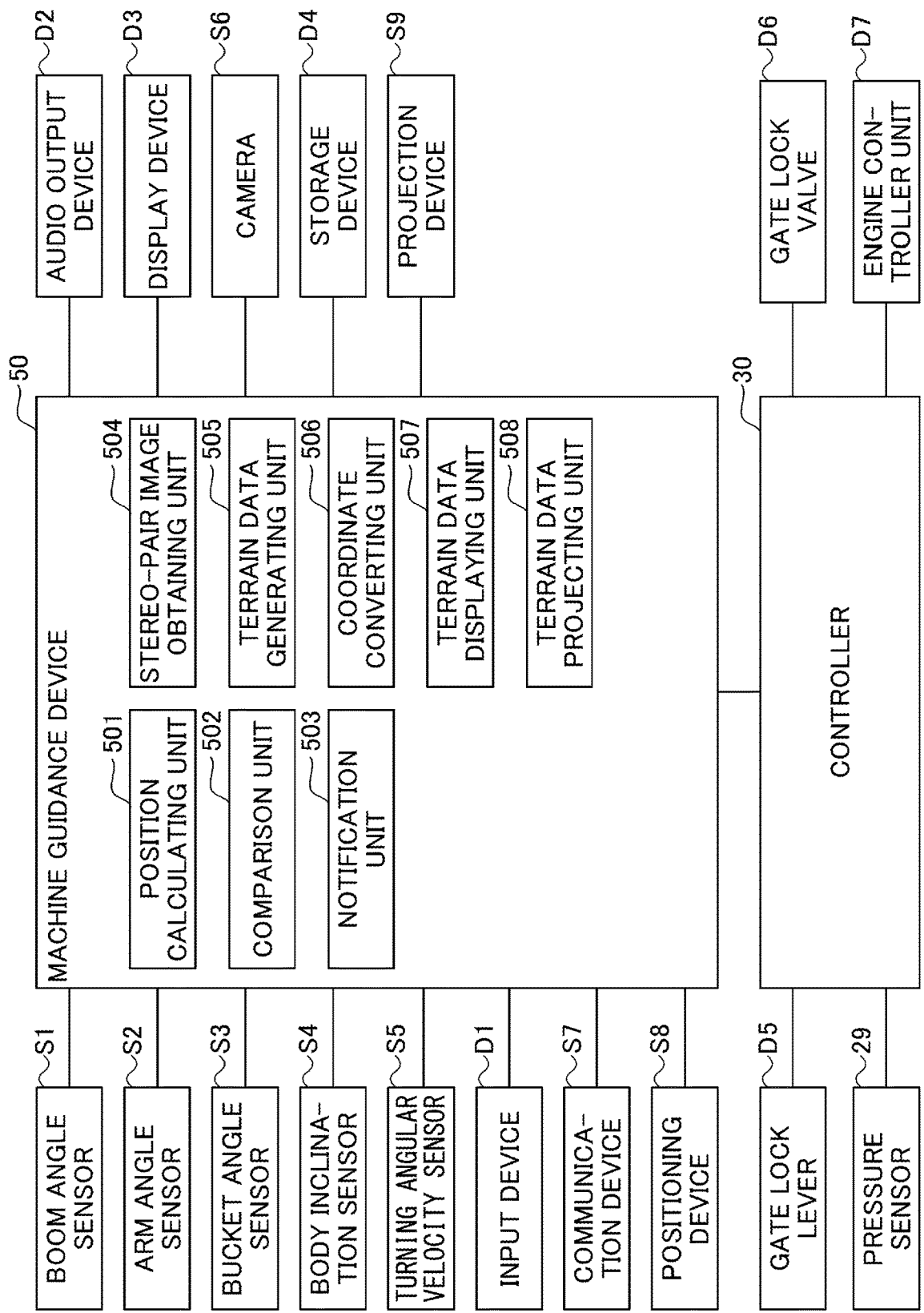
FIG. 3 is a block diagram illustrating an example of a configuration of a machine guidance device.

Next, referring to FIG. 3, various functional elements of the machine guidance device 50 will be described. FIG. 3 is a functional block diagram illustrating an example of a configuration of the machine guidance device 50.

In the present embodiment, the controller 30 controls whether to cause the machine guidance device 50 to perform guidance, in addition to controlling the entire operation of the shovel. Specifically, based on the state of the gate lock lever D5 and a detection signal output from the pressure sensor 29, the controller 30 determines whether to cause the machine guidance device 50 to perform guidance.

Next, the machine guidance device 50 will be described. In the present embodiment, the machine guidance device 50 receives various types of signals and data output from, for example, the boom angle sensor S1, the arm angle sensor S2, the bucket angle sensor S3, the body inclination sensor S4, the turning angular velocity sensor S5, the input device D1, and the controller 30. The machine guidance device 50 calculates a tip position of the bucket 6 based on the received signal and data. The machine guidance device 50 then visually and audibly outputs information in accordance with the distance between the tip position of the bucket 6 and a target surface, so as to guide the operation of the shovel.

The machine guidance device 50 includes functional units that perform various functions. In the present embodiment, the machine guidance device 50 includes a position calculating unit 501, a comparison unit 502, a notification unit 503, a stereo-pair image obtaining unit 504, a terrain data generating unit 505, a coordinate converting unit 506, a coordinate correcting unit 510, a terrain data displaying unit 507, and a terrain data projecting unit 508.

The position calculating unit 501 calculates the position of a working portion of the end attachment. For example, the position calculating unit 501 calculates the tip position of the bucket 6, based on the current position of the shovel, the direction of the shovel, and the orientation of the attachment. The position and the direction of the shovel are calculated based on information output from the positioning device S8. The orientation of the attachment is calculated based on information output from the boom angle sensor S1, the arm angle sensor S2, the bucket angle sensor S3, and the body inclination sensor S4.

The comparison unit 502 calculates a difference in height between the tip position of the bucket 6 calculated by the position calculating unit 501 and a target surface. For example, the comparison unit 502 uses plane coordinates (such as the latitude and longitude) of the tip position of the bucket 6 calculated by the position calculating unit 501 to obtain the height of the target surface by referring to pre-input design data.

The notification unit 503 notifies the operator of the shovel of various types of information, based on comparison results obtained by the comparison unit 502. For example, the notification unit 503 transmits a notification command to one or both of the audio output device D2 and the display device D3. In response to the notification command, the audio output device D2 emits a predetermined sound. In response to the notification command, the display device D3 displays a predetermined image. Different levels of notifications may be set in accordance with the difference in height between the tip position of the bucket 6 and the target surface.

The stereo-pair image obtaining unit 504 obtains a stereo pair of images. The stereo pair of images is a pair of camera images used to obtain a distance between the stereo camera S6 and a point to be measured (hereinafter referred to as a "measurement point") by using a triangulation approach. In the present embodiment, the stereo-pair image obtaining unit 504 obtains a pair of camera images output from the stereo camera S6 as a stereo pair of images. In addition, parameters related to the stereo camera S6, such as the installation position, the installation angle, and the focal length of the stereo camera S6, are preliminarily stored in the storage device D4. The stereo-pair image obtaining unit 504 reads the parameters from the storage device D4 when necessary.

The stereo-pair image obtaining unit 504 obtains, as a stereo pair of images, a pair of camera images simultaneously captured by a pair of imaging units of the stereo camera S6. Then, the stereo-pair image obtaining unit 504 obtains a distance between the stereo camera S6 and each measurement point, based on offsets in pixels in each of the pair of the captured camera images and also on the distance between the pair of imaging units. The pixels correspond to the measurement points.

Further, the stereo-pair image obtaining unit 504 obtains a stereo pair of images, every time a predetermined condition is satisfied. The predetermined condition is set based on, for example, the turning angle of the upper turning body 3 and the moving distance of the shovel. In the present embodiment, the stereo-pair image obtaining unit 504 obtains a stereo pair of images, every time the upper turning body 3 is turned by a predetermined turning angle α. For example, the turning angle is derived from information output from the turning angular velocity sensor S5. Alternatively, the stereo-pair image obtaining unit 504 may obtain a stereo pair of images every time the shovel is moved (travels) by a predetermined distance. For example, the moving distance is derived from information output from the positioning device S8. Alternatively, the stereo-pair image obtaining unit 504 may dynamically determine a threshold for the turning angle or the moving distance, which is used as the predetermined obtaining condition, such that a stereo pair of images including desired measurement points can be efficiently obtained. The stereo-pair image obtaining unit 504 may obtain a stereo pair of images at each predetermined time interval, or may obtain a stereo pair of images at any timing in accordance with an input operation (such as a switch operation) performed by the operator of the shovel. Based on a stereo pair of images obtained in the above-described manner, the machine guidance device 50 measures terrain information in the vicinity of the shovel during or after construction.

The terrain data generating unit 505 generates terrain data. The terrain data is, for example, a collection of three-dimensional coordinates that represent each point on the ground surface in the vicinity of the shovel. The three-dimensional coordinates are, for example, coordinates in a camera coordinate system. The camera coordinate system is a camera-based coordinate system. For example, the camera coordinate system is a three-dimensional orthogonal XYZ coordinate system in which the origin is at the center point of the stereo camera S6, the X-axis is in the middle of two optical axes of the stereo camera S6, and the Z-axis is perpendicular to the plane including the two optical axes. In the present embodiment, the terrain data generating unit 505 derives three-dimensional coordinates of each measurement point in the camera coordinate system, based on distances to the measurement points derived by the stereo-pair image obtaining unit 504.

The terrain data generating unit 505 may be configured to obtain the current shape of the ground surface, based on a known shape of the ground surface at a predetermined point in time and also the trajectory of the end attachment at and after the predetermined point in time. The known shape of the ground surface at the predetermined point in time is, for example, terrain data that represents terrain stored in the storage device D4 at a point in time when excavation work is started. In this case, the terrain data may be measured by any method such as surveying using a total station. The trajectory of the end attachment is, for example, the trajectory of the bucket 6. The trajectory of the bucket 6 is derived from information output from each of the boom angle sensor S1, the arm angle sensor S2, the bucket angle sensor S3, and the body inclination sensor S4, which is continuously obtained in predetermined periods. The terrain data generating unit 505 can derive the current shape of the ground surface by deriving an area excavated or backfilled by the bucket 6, based on the known shape of the ground surface at a point in time when excavation work is started and also the trajectory of the bucket 6 thereafter.

The coordinate converting unit 506 converts coordinates in the camera coordinate system into coordinates in another coordinate system. For example, the coordinate converting unit 506 converts coordinates in the camera coordinate system into coordinates in a shovel coordinate system or a reference coordinate system. The shovel coordinate system is a shovel-based coordinate system. For example, the shovel coordinate system is a three-dimensional orthogonal XYZ coordinate system in which the origin is the intersection between the turning axis of the upper turning body 3 and a virtual ground plane of the lower traveling body 1, the X-axis is the front-back axis of the lower traveling body 1, the Y-axis is the right-left axis of the lower traveling body 1, and the Z-axis is the turning axis. For example, the reference coordinate system includes the World Geodetic System. The World Geodetic System is a three-dimensional orthogonal XYZ coordinate system in which the origin is at the center of gravity of the earth, the X-axis passes through the intersection of the Greenwich meridian and the equator, the Y-axis passes through 90 degrees east longitude, and the Z-axis passes through the north pole. In the present embodiment, the coordinate converting unit 506 converts three-dimensional coordinates of each measurement point in the camera coordinate system, derived by the terrain data generating unit 505, into coordinates in the World Geodetic System.

The terrain data displaying unit 507 displays terrain data generated by the machine guidance device 50. In the present embodiment, the terrain data displaying unit 507 generates a three-dimensional image (such as a wireframe or a polygon mesh) of terrain in the vicinity of the shovel, based on terrain data that is a collection of coordinates converted by the coordinate converting unit 506, and displays the generated three-dimensional image on the display device D3. The terrain data displaying unit 507 may generate a three-dimensional image of a target surface based on design data, and may display, on the display device D3, the three-dimensional image of the target surface together with the three-dimensional image of the terrain in the vicinity of the shovel. Further, the terrain data displaying unit 507 may combine the three-dimensional image of the terrain in the vicinity of the shovel with images captured by the stereo camera S6, and display the combined images.

The terrain data projecting unit 508 uses the projection device S9 to enable visualization of the relationship between the current shape of the ground surface in the vicinity of the shovel and the shape of a target surface. In the present embodiment, the terrain data projecting unit 508 projects light onto the ground surface in the vicinity of the shovel by controlling the projection device S9. In addition, the terrain data projecting unit 508 changes the color and illuminance of light projected by the projection device S9, in accordance with the distance between the ground surface and the target surface.

Figure 4:
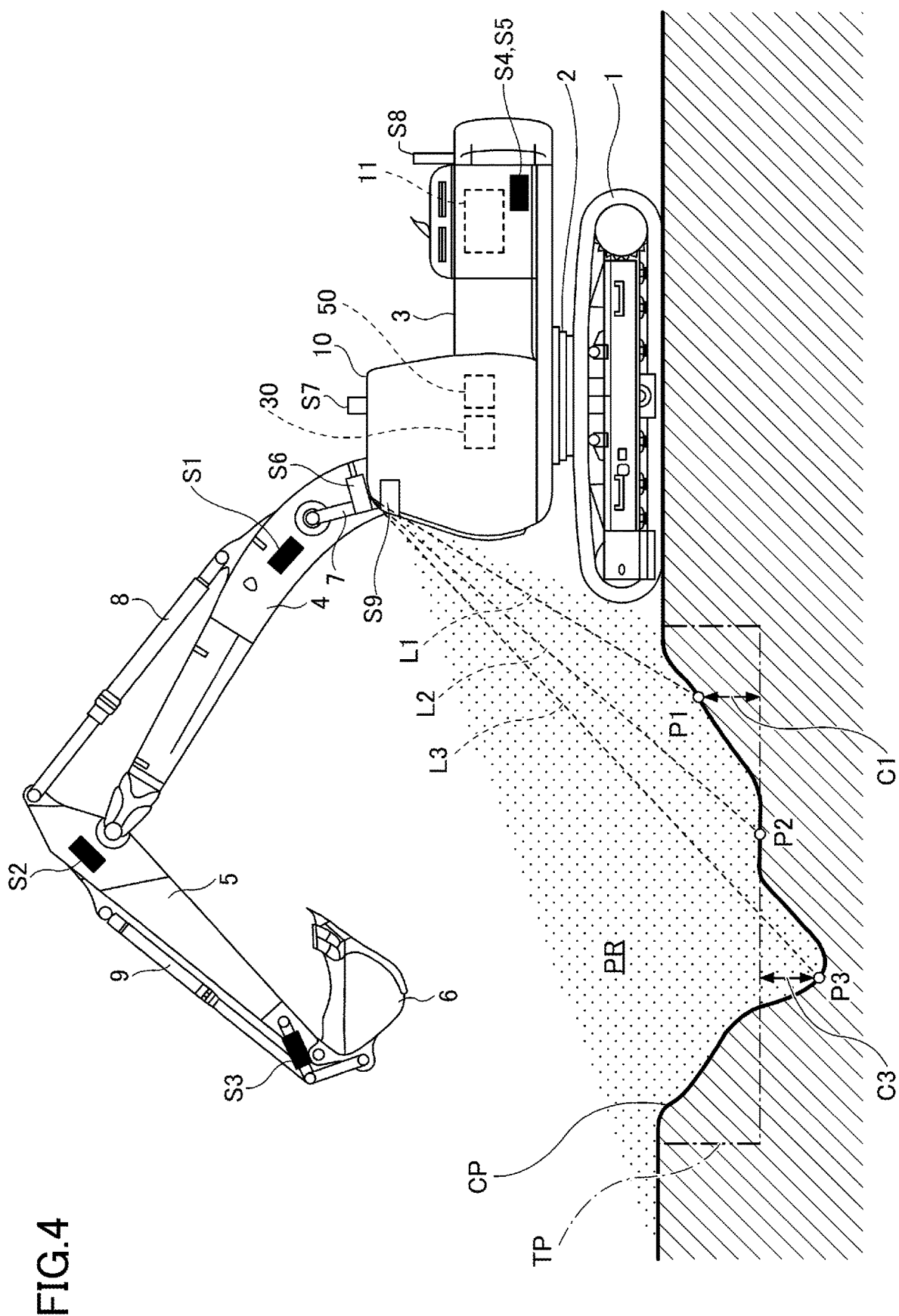
FIG. 4 is a cross-sectional side view of the ground surface where the shovel is located.
Figure 5:
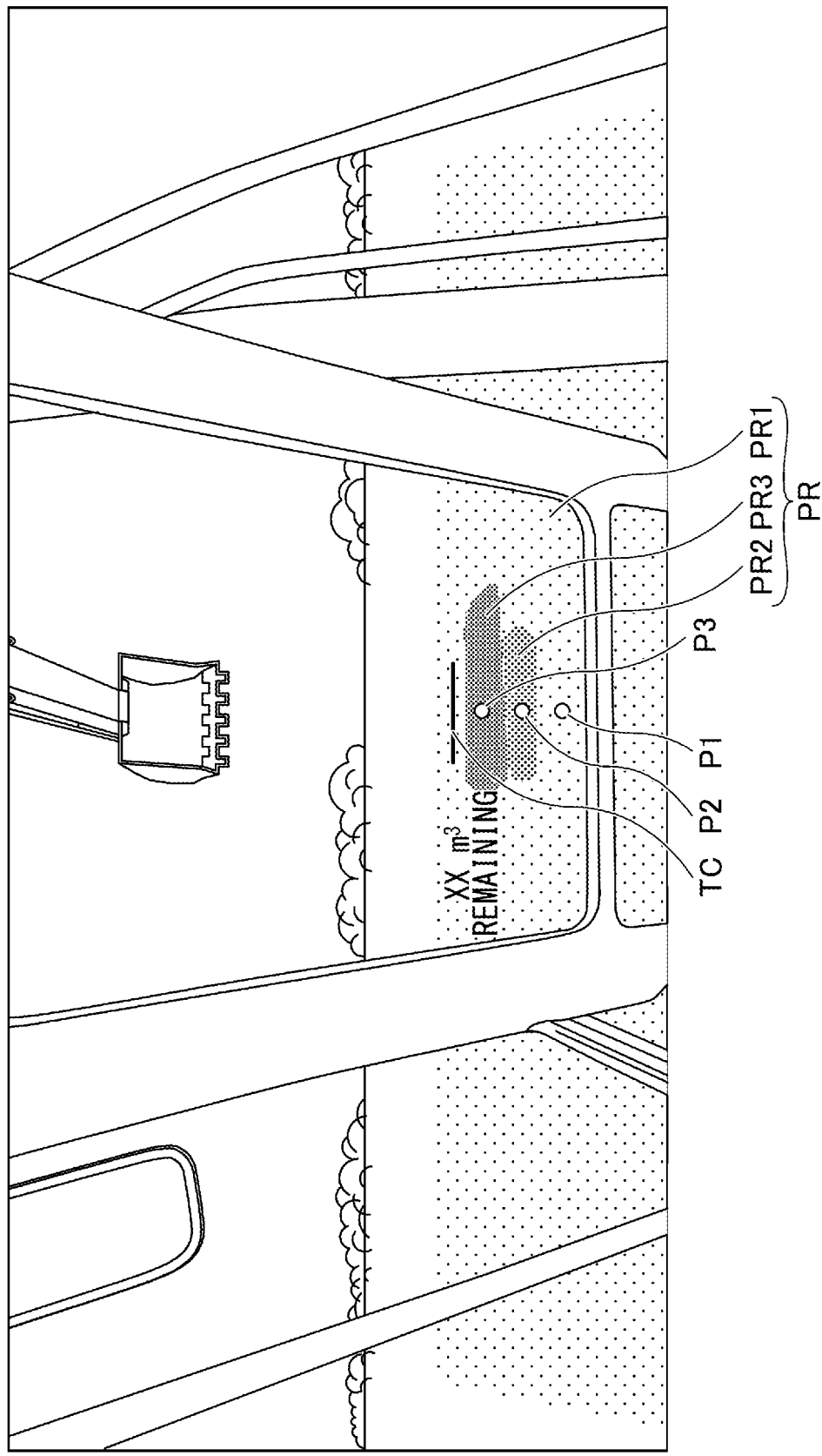
FIG. 5 is a diagram illustrating the ground surface in front of the shovel when viewed from the inside of a cabin.

Referring to FIG. 4 and FIG. 5, a process (hereinafter referred to as a "visualization process") in which the terrain data projecting unit 508 uses the projection device S9 to enable visualization of the relationship between the current shape of the ground surface in the vicinity of the shovel and the shape of a target surface will be described. FIG. 4 is a cross-sectional side view of the ground surface where the shovel is located. FIG. 5 illustrates the ground surface in front of the shovel when viewed from the inside of the cabin 10.

The projection device S9 is configured to project light onto the ground surface in front of the shovel. Specifically, the projection device S9 projects the number of light beams, corresponding to the number of pixels, onto the ground surface in front of the shovel. FIG. 4 illustrates the visualization process when excavation work is performed. In the excavation work, a target surface is set below the current ground surface. A dot-hatched area PR of FIG. 4 indicates a projection range of the projection device S9. The thick continuous line indicates the shape of a current ground surface CP, and the long-dash short-dash line indicates the shape of a target surface TP. Light beams L1 through L3 are part of light beams, among the number of light beams corresponding to the number of the pixels. Points P1, P2, and P3 are points on the ground surface CP onto which the light beams L1, L2, and L3 are projected, respectively. The point P1 is located at a higher (shallower) position than the target surface TP, and C1 denotes a vertical distance from the point P1 to the target surface TP. The point P2 is located on the target surface TP. The point P3 is located below (deeper than) the target surface TP, and C3 denotes a vertical distance from the point P3 to the target surface TP.

The terrain data projecting unit 508 derives three-dimensional coordinates of each point onto which the projection device S9 projects a light beam, based on the current position and direction of the projection device S9 and also parameters (such as the resolution and projection angle) of the projection device S9. The current position and direction of the projection device S9 are derived from the current position and direction of the shovel. Relative changes in the current position and direction of the projection device S9 may be determined based on information output from the body inclination sensor S4 and the turning angular velocity sensor S5. In the example of FIG. 4, the terrain data projecting unit 508 derives three-dimensional coordinates of points corresponding to 1024×768 pixels, including the points P1 through P3.

Subsequently, the terrain data projecting unit 508 derives a vertical distance between each of the points and the target surface, based on the three-dimensional coordinates of each of the points derived as described above and also information related to the target surface included in design data. In the example of FIG. 4, the terrain data projecting unit 508 derives the vertical distance C1 from the point P1 to the target surface TP, a vertical distance C2 (=0) from the point P2 to the target surface TP, and the vertical distance C3 from the point P3 to the target surface TP. The target surface TP illustrated in FIG. 4 is set as a final construction target surface. However, the target surface TP may be a reference line used during construction. In this case, the target surface TP may be a surface having a predetermined depth from the current ground surface to a final construction target surface. Further, there may be a plurality of surfaces each having a predetermined depth from the current ground surface to a final construction target surface. For example, if the depth from the current ground surface to a final construction target surface is 5 meters, the target surface TP may be set for each meter. In this manner, the ground surface can be excavated stepwise. Accordingly, in a case of is a buried object being present, damage to the buried object can be prevented.

Subsequently, in accordance with the vertical distance from each of the points to the target surface, the terrain data projecting unit 508 sets the color and illuminance of a light beam irradiated to a corresponding point. In the example of FIG. 4, the terrain data projecting unit 508 sets the color to green when the vertical distance is zero. As the vertical distance from a point increases in the positive direction (as the point becomes shallower than the target surface TP), the color is set closer to blue. As the vertical distance from a point increases in the negative direction (as the point becomes deeper than the target surface TP), the color is set closer to red. Note that other colors may be used. The terrain data projecting unit 508 may change the color of light in a stepwise manner or in a non-stepwise manner in accordance with the vertical distance to each point. Further, the terrain data projecting unit 508 may change color gradations of light projected onto the ground surface CP in accordance with the vertical distance to each point. If color gradations are represented by halftone dots, the density of the halftone dots may be changed. In this case, the color of light projected onto the ground surface CP may be a single color.

A dot-hatched area PR of FIG. 5 indicates a projection range of the projection device S9. In the dot-hatched area PR, three colors of light beams are projected in accordance with the vertical distances. Specifically, the current ground surface CP within an area PR1 is higher (shallower) than the target surface TP. The point P1 is included in the area PR1. The height of current ground surface CP within an area PR2 is equal to the height of the target surface TP. The point P2 is included in the area PR2. The current ground surface CP within an area PR3 is lower (deeper) than the target surface TP. The point P3 is included in the area PR3. In the above case, the projection device S9 irradiates the area PR1 with a blue light beam. Further, the projection device S9 irradiates the area PR2 with a green light beam, and irradiates the area PR3 with a red light beam. The projection device S9 may uniformly irradiate the entire area PR2. Alternatively, in addition to inside the area PR2, the projection device S9 may also irradiate the outline of the area PR2 such that the outline of the area PR2 stands out. For example, the projection device S9 may irradiate the outline with a light beam of a different color. Further, a contour line (a depth contour line) may be displayed for each predetermined height (depth) within the area PR2. The same applies to the area PR3.

The terrain data projecting unit 508 may project character information. FIG. 5 illustrates a state in which character information "XX $m^3$ remaining" is projected in the area PR1. The character information "XX $m^3$ remaining" indicates the remaining amount of soil to be excavated. The terrain data projecting unit 508 may project the character information at a predetermined position, or may select a relatively flat portion of the area PR1 and project the character information onto the relatively flat portion. The character information may be projected in the area PR2 or in the area PR3. Further, the terrain data projecting unit 508 may also project a target ground contact position TC. The target ground contact position TC is, for example, a position on the ground surface with which the tip of the bucket 6 is expected to make contact. FIG. 5 illustrates a state in which the target ground contact position TC is projected in the area PR1. In addition, the same information as that projected by the terrain data projecting unit 508 may also be displayed on the display device D3 in the cabin 10.

Figure 6:
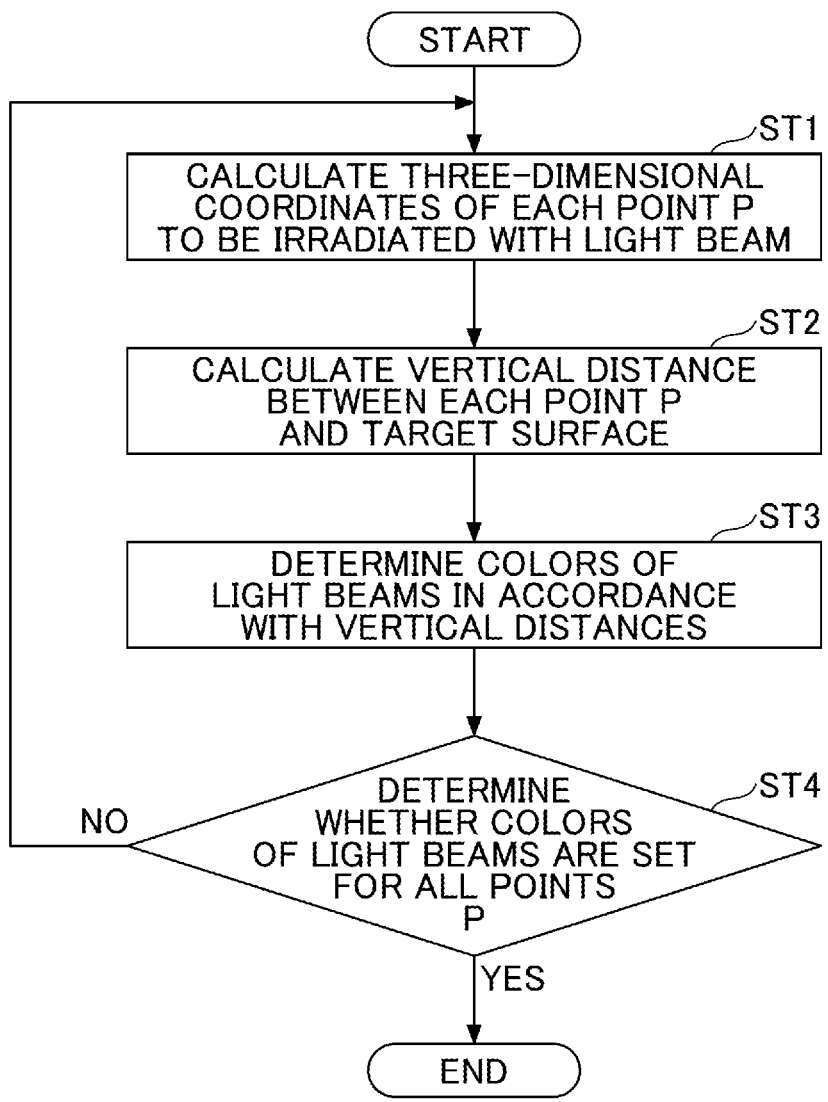
FIG. 6 is a flowchart of an example of a visualization process.

Next, referring to FIG. 6, a flow of the visualization process will be described. FIG. 6 is a flowchart of an example of the visualization process. The terrain data projecting unit 508 repeats the visualization process at a predetermined control cycle.

First, the terrain data projecting unit 508 calculates three-dimensional coordinates of each point P to be irradiated with a light beam (step ST1). For example, as illustrated in FIG. 4, the terrain data projecting unit 508 calculates three-dimensional coordinates of the points P1, P2, and P3 to be irradiated with the respective light beams L1, L2, and L3.

Next, the terrain data projecting unit 508 calculates the vertical distance between each of the points P and a target surface (step ST2). For example, as illustrated in FIG. 4, the terrain data projecting unit 508 calculates the vertical distances C1, C2 (=0), and C3 from the target surface TP to the points P1, P2, and P3.

Next, the terrain data projecting unit 508 determines colors of light beams in accordance with the vertical distances (step ST3). For example, as illustrated in FIG. 4, the terrain data projecting unit 508 sets the color of the light beam L1 emitted to the point P1, located at the vertical distance C1 from the target surface TP, to blue. Further, the terrain data projecting unit 508 sets the color of the light beam L2 emitted to the point P2, located at the same height as the target surface TP, to green. Further, the terrain data projecting unit 508 sets the color of the light beam L3 emitted to the point P3, located at the vertical distance C3 from the target surface TP, to red.

Next, the terrain data projecting unit 508 determines whether the colors of the light beams are set for all the points P (step ST4).

If it is determined that the colors of the light beams are not set for all the points P (no in step ST4), the terrain data projecting unit 508 causes the process to return to step ST1, and performs the process of step ST1 and the subsequent steps again.

If it is determined that the colors of the light beams are set for all the points P (yes in step ST4), the terrain data projecting unit 508 ends the visualization process.

As described above, the terrain data projecting unit 508 uses projection mapping performed by the projection device S9 to enable visualization of the relationship between the shape of the current ground surface CP and the shape of the target surface TP. Specifically, the terrain data projecting unit 508 classifies the vertical distances between the ground surface CP and the target surface TP by color for visualization. The operator of the shovel can check the depth of the target surface TP, while visually checking the tip of the bucket 6 at the same time. Namely, the operator can check irregularities of the current ground surface CP with respect to the target surface TP, and can determine where and to what extent the current ground surface should be excavated, or determine to what extent the current ground surface should be backfilled. In addition, the operator of the shovel is not required to look away from the tip of the bucket 6 in order to check the depth of the target surface. This is because, without looking at the display device D3, the operator of the shovel can check the depth of the target surface TP by looking at light beams (images) projected onto the ground surface. Therefore, the shovel allows work efficiency to be improved and work time to be shortened.

Furthermore, with the above-described configuration, it is possible to provide an effect of reducing the eye strain of the operator of the shovel. This is because the operator is not required to move the line of sight between the tip of the bucket 6 and the display device D3. Namely, there is no need to move the line of sight between the tip of the bucket 6 located relatively far and the display device D3 located relatively close, and there is also no need to frequently adjust the focal length of the eyes. It should be noted that the display device D3 provided in the cabin 10 may display the same images as those projected by the projection device S9 onto the ground surface in front of the shovel. In this case, images representing the area PR2 and the area PR3 may be superimposed on camera images captured in front of the shovel by the imaging device.

As described above, the projection device S9 projects construction information onto the ground surface located outside the shovel. Therefore, not only the operator of the shovel, but also workers in the vicinity of the shovel can grasp the construction information.

Figure 7:
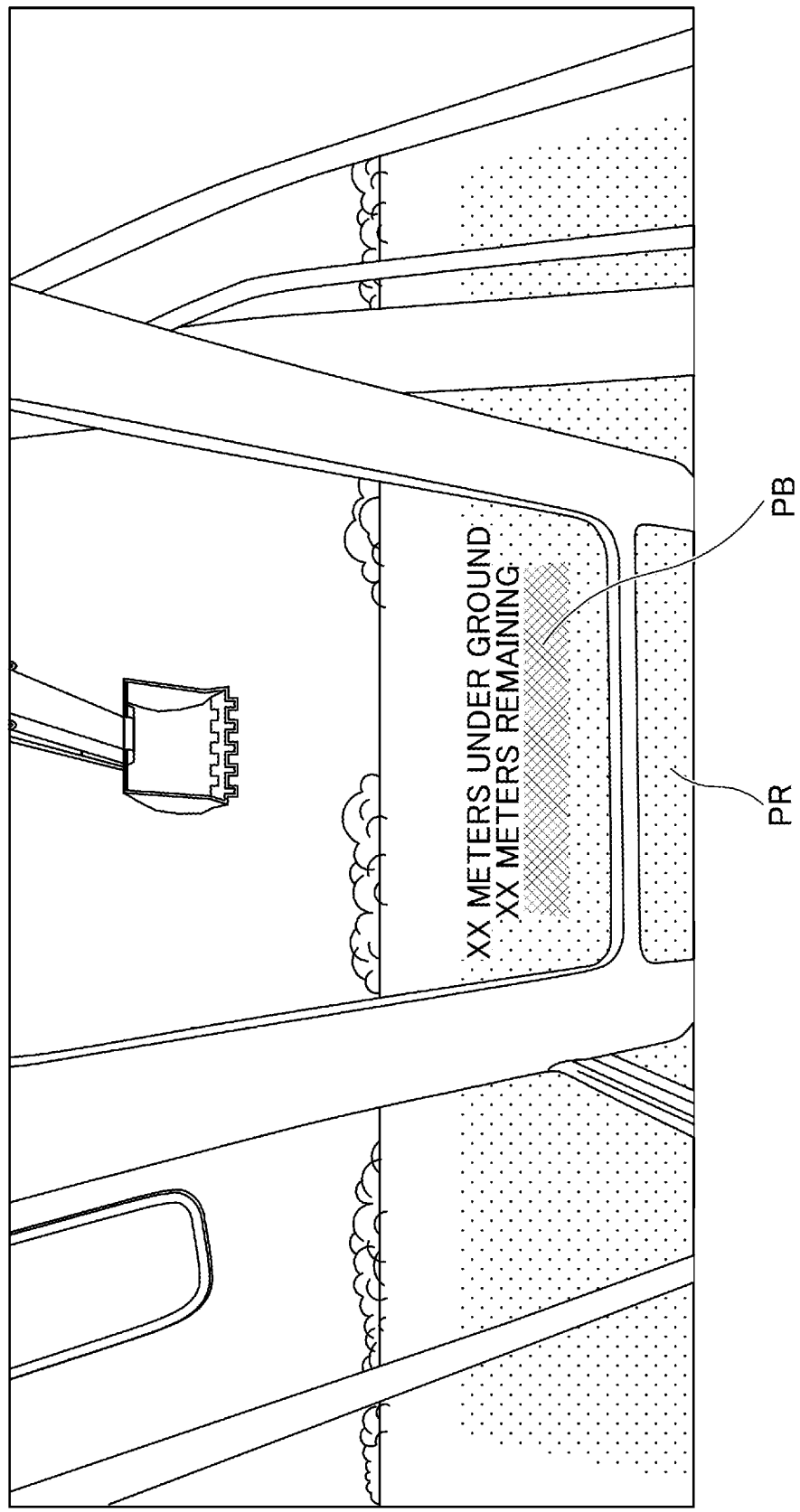
FIG. 7 is a diagram illustrating the ground surface in front of the shovel when viewed from the inside of the cabin.
Figure 8:
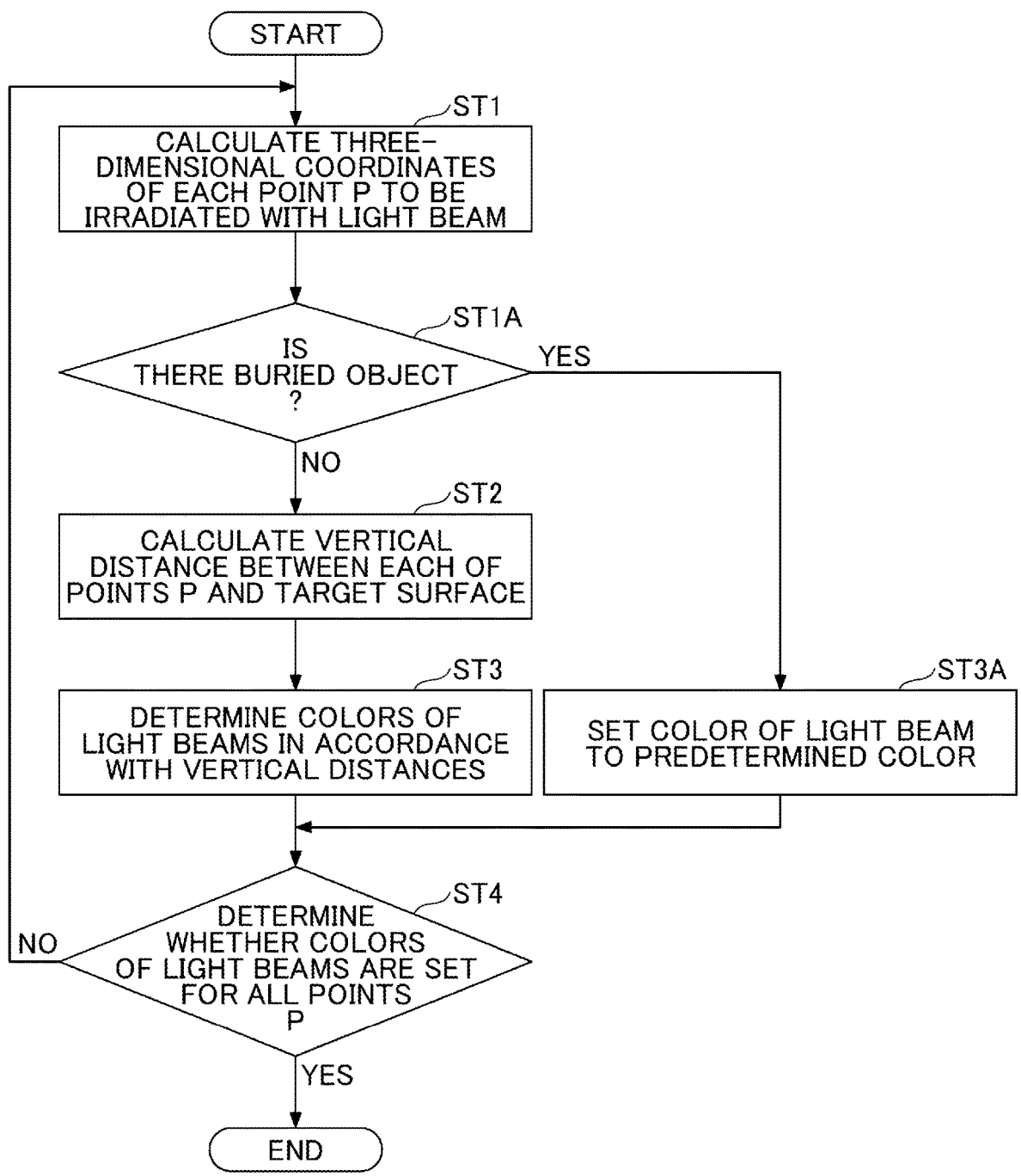
FIG. 8 is a flowchart of another example of the visualization process.

Next, referring to FIG. 7 and FIG. 8, another example of the visualization process will be described. FIG. 7, which is a diagram illustrating the ground surface in front of the shovel when viewed from the inside of the cabin 10, corresponds to FIG. 5. FIG. 8 is a flowchart of another example of the visualization process illustrated in FIG. 6.

The example of FIG. 7 differs from the example of FIG. 5 in that the dot-hatched area PR includes a buried object area BP; however, the example of FIG. 7 is the same as the example of FIG. 5 in other respects. Further, the flowchart of FIG. 8 differs from the flowchart of FIG. 6 in that step ST1A and step ST3A are included, however, the flowchart of FIG. 8 is the same as the flowchart of FIG. 6 in other respects. Therefore, a description of common portions will be omitted, and only differences will be described.

After calculating three-dimensional coordinates of a given point to be irradiated with a light beam, the terrain data projecting unit 508 determines whether there is a buried object directly under the given point (step ST1A). For example, based on design data, the terrain data projecting unit 508 determines whether there is a buried object directly under the given point.

If it is determined that there is no buried object (no in step ST1A), the terrain data projecting unit 508 performs the process as of step ST2.

If it is determined that there is a buried object (yes in step ST1A), the terrain data projecting unit 508 sets the color of the light beam irradiated to the point to a predetermined color (step ST3A). For example, regardless of the vertical distance between the point and the target surface TP, the terrain data projecting unit 508 selects a color (such as grey) that represents the underground buried object as the color of the light beam irradiated to the point. FIG. 7 illustrates a state in which the light beam having the color that represents the underground buried object is projected in the buried object area BP.

The terrain data projecting unit 508 may project character information, together with the light beam (image) having the color representing the underground buried object. In FIG. 7, character information "XX meters under the ground" and "XX meters remaining" is projected in the dot-hatched area PR. "XX meters under the ground" indicates a buried depth of the underground buried object. "XX meters remaining" indicates a distance to the underground buried object, namely a distance from the current ground surface to the underground buried object. The terrain data projecting unit 508 may project the character information at a predetermined position, or may select a relatively flat portion of the dot-hatched area PR and project the character information onto the relatively flat portion. The terrain data projecting unit 508 may project the character information at a position as close as possible to the image representing the underground buried object.

Accordingly, the terrain data projecting unit 508 allows the operator of the shovel to recognize the presence of an underground buried object by visualizing the underground buried object. The operator of the shovel can identify the position of the underground buried object without looking away from the tip of the bucket 6. Therefore, the operator of the shovel can avoid damage to the underground buried object during excavation work.

Figure 9:
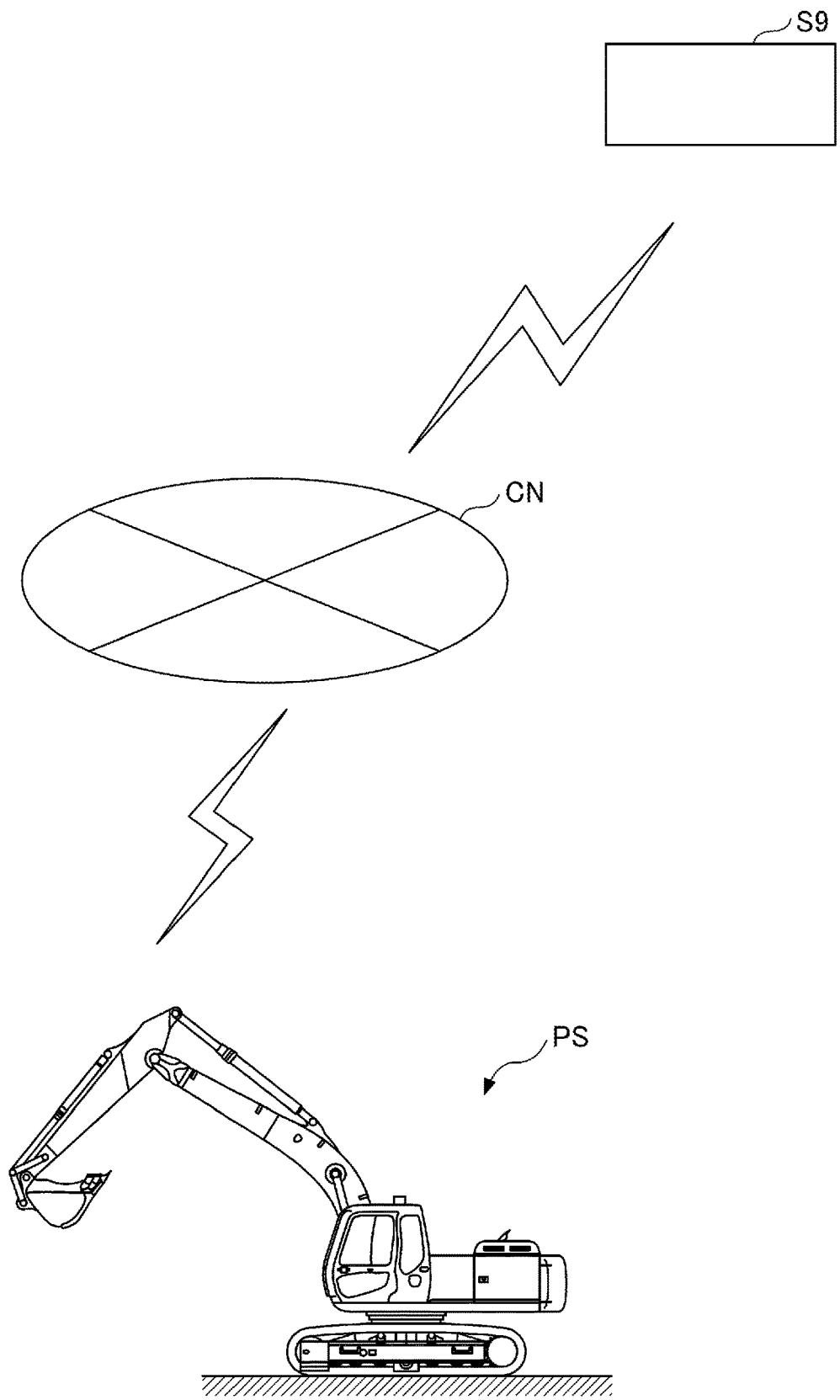
FIG. 9 is a diagram illustrating the relationship between a shovel and a projection device.

Next, referring to FIG. 9, yet another example of the visualization process will be described. FIG. 9 is a diagram illustrating the relationship between a shovel PS and the projection device S9. The shovel PS of FIG. 9 differs from the shovel of FIG. 1 in that the projection device S9 is installed outside the shovel PS; however, the shovel PS of FIG. 9 is the same as the shovel of FIG. 1 in other respects. Therefore, a description of common portions will be omitted, and only differences will be described.

In the example of FIG. 9, the projection device S9 is attached to a lattice tower installed at a construction site. The shovel PS uses the communication device S7 to wirelessly transmit and receive information to and from the projection device S9 via a communication network CN. Note that information may be directly transmitted and received to and from the projection device S9 without using the communication network CN.

The shovel PS may simultaneously control a plurality of projection devices S9 attached to the lattice tower at the construction site. Conversely, the projection device S9 may be controlled by a plurality of shovels PS.

With the above configuration, the shovel PS can provide a similar effect to that of the shovel described with reference to FIG. 1 through FIG. 8. Further, the shovel PS can enable visualization of the relationship between the current shape of the ground surface and the shape of a target surface by controlling one or more projection devices S9 installed outside the shovel PS. Therefore, the shovel PS can enable visualization of the relationship between the current shape of the ground surface and the shape of the target surface in a wider range.

Figure 10:
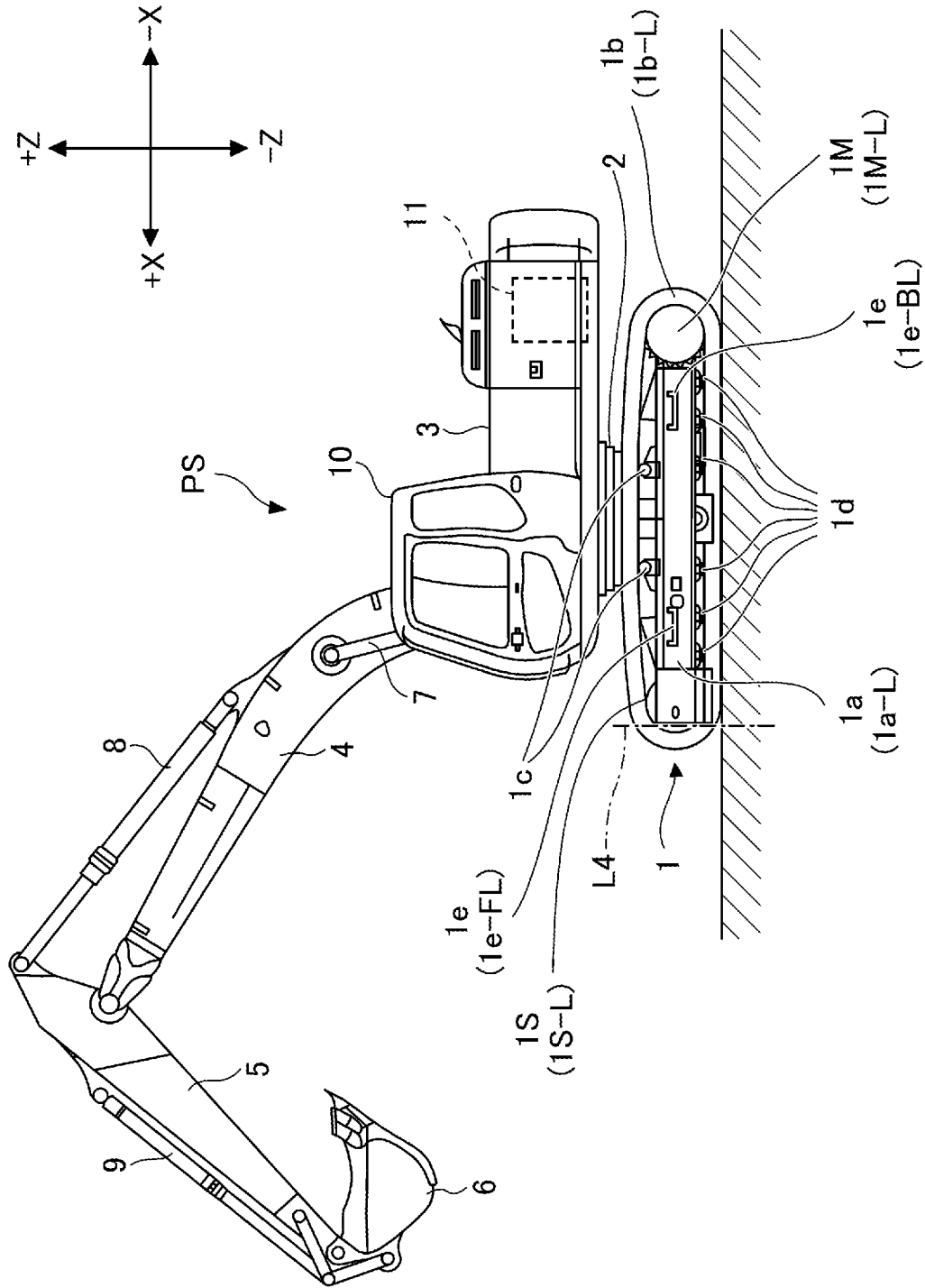
FIG. 10 is a side view of a shovel.
Figure 11:
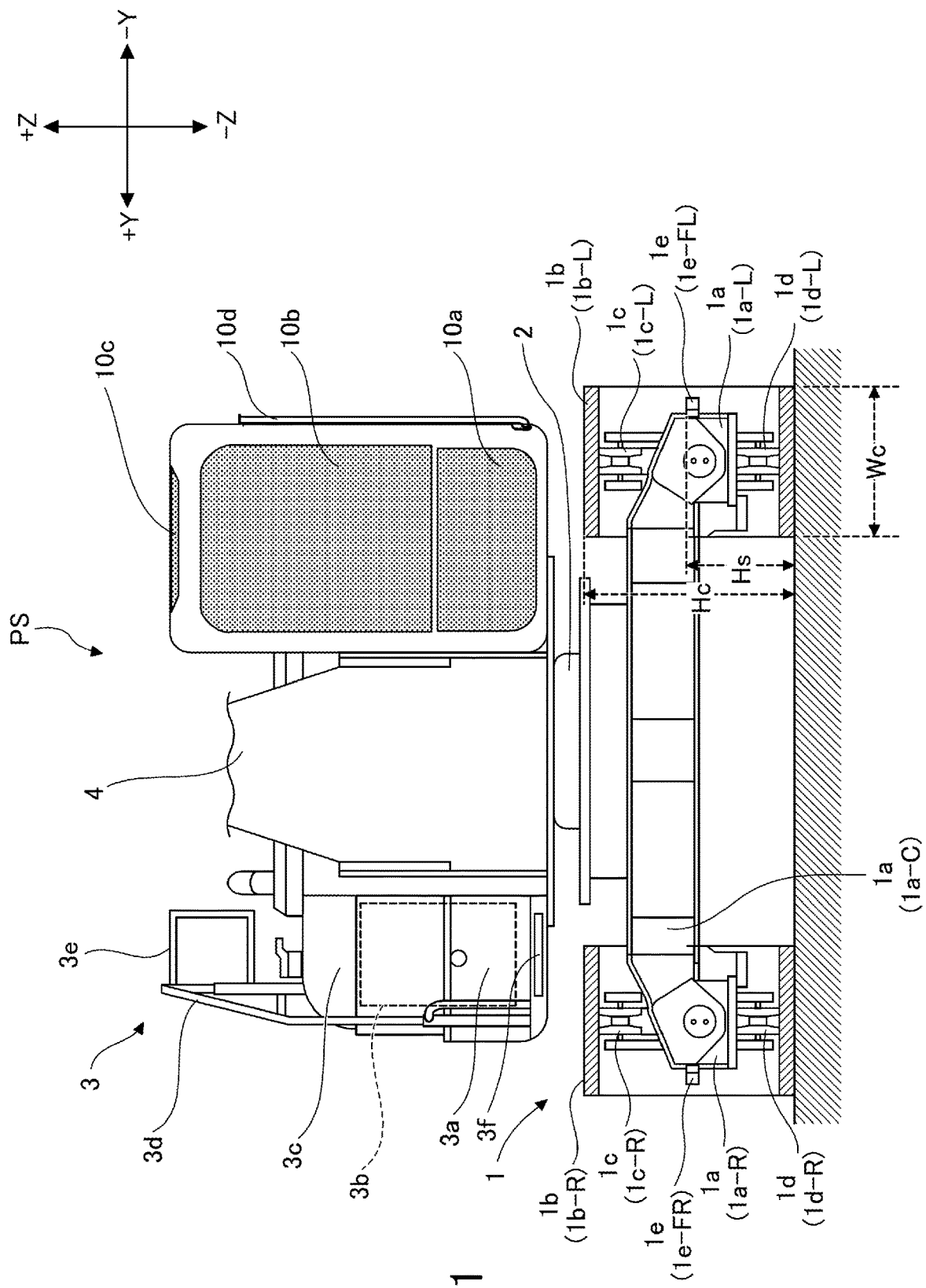
FIG. 11 is a front view of the shovel of FIG. 10.

Next, referring to FIG. 10 and FIG. 11, a shovel (an excavator) according to an embodiment of the present invention will be further described. FIG. 10 is a side view of a shovel PS. FIG. 11 is a front view of the shovel PS. The orientation of the shovel PS differs between FIG. 10 and FIG. 11.

The shovel PS includes the crawler-type lower traveling body 1.

In the related art, a shovel that includes a step attached to a frame of a crawler is known.

The step is typically painted with the same paint as the frame. Thus, it is difficult to distinguish the step from the frame.

Therefore, it is desired to provide a shovel including a step that can be readily distinguished from a frame of a crawler-type lower traveling body.

In the shovel PS, an upper turning body 3 is mounted on the lower traveling body 1 via a turning mechanism 2. A boom 4 is attached to the upper turning body 3. An arm 5 is attached to the end of the boom 4. A bucket 6 is attached to the end of the arm 5. The boom 4, the arm 5, and the bucket 6 constitute an excavation attachment, which is an example of an attachment. The boom 4, the arm 5, and the bucket 6 are hydraulically driven by a boom cylinder 7, an arm cylinder 8, and a bucket cylinder 9, respectively. The upper turning body 3 includes a power source such as an engine 11. In FIG. 11, the arm 5, the bucket 6, the boom cylinder 7, the arm cylinder 8, the bucket cylinder 9 are not depicted for clarification purposes.

A cabin 10 is mounted at the front end (+X side end) on the left side (−Y side) of the upper turning body 3. A lower front window 10a and an upper front window 10b cover the front surface (+X side surface) of the cabin 10. The upper front window 10b may be configured to be openable and closable. A top window 10c covers the top surface (+Z side surface) of the cabin 10. A handrail 10d is installed on the outer side of a pillar located at the front left side of the cabin 10.

A tool box 3a is provided at the front end (+X side end) of the right side (+Y side) of the upper turning body 3. An aqueous urea solution tank 3b is provided on the rear side (−X side) of the tool box 3a, and a fuel tank 3c is provided on the rear side of the aqueous urea solution tank 3b. In FIG. 11, the aqueous urea solution tank 3b is placed within the cover of the upper turning body 3, and is thus indicated by a hidden line. The tool box 3a, the cover covering the aqueous urea solution tank 3b, and the fuel tank 3c form stairs, which allow a worker to go up and down. Therefore, a handrail 3d is installed on the outer side (+Y side) of the stairs. A guardrail 3e is attached to the upper surface of the fuel tank 3c. The guardrail 3e may be attached to the top surface of the cover located on the rear side of the cabin 10.

The lower traveling body 1 is mainly configured by frames 1a, crawler belts 1b, carrier rollers 1c, track rollers 1d, steps 1e, and traveling hydraulic motors 1M. FIG. 11 illustrates main elements of the lower traveling body 1 when viewed in a plane (+X side) including a long-dash short-dash line L4 of FIG. 10.

The frames 1a are members forming the framework of the lower traveling body 1. The frames 1a include a left frame 1a-L, a right frame 1a-R, and a center frame 1a-C coupling the left frame 1a-L to the right frame 1a-R.

The crawler belts 1b are continuous tracks (caterpillars) rotationally driven by the traveling hydraulic motors 1M. The crawler belts 1b include a left crawler belt 1b-L and a right crawler belt 1b-R.

The carrier rollers 1c are driven rollers provided between the frames 1a and the crawler belts 1b above the frames 1a. The track rollers 1d are driven rollers provided between the frames 1a and the crawler belts 1b below the frames 1a.

The steps 1e are members used by a worker to go up and down the lower traveling body 1. In the present embodiment, the steps 1e include a front left step 1e-FL, a back left step 1e-BL, a front right step 1e-FR, and a back right step 1e-BR (not illustrated).

The front left step 1e-FL and the back left step 1e-BL are welded to the left side surface of the left frame 1a-L. As illustrated in FIG. 11, the front left step 1e-FL is configured not to extend beyond the width Wc of the left crawler belt 1b-L. Namely, the front left step 1e-FL is configured not to project from the left end of the left crawler belt 1b-L. The height Hs of the front left step 1e-FL is approximately half the height Hc of the left crawler belt 1b-L. The same applies to the back left step 1e-BL, the front right step 1e-FR, and the back right step 1e-BR.

For example, the worker can reach the top of the upper turning body 3 by using the front right step 1e-FR, the upper surface of the right crawler belt 1b-R, a step 3f, the upper surface of the tool box 3a, the upper surface of the cover that covers the aqueous urea solution tank 3b, and the upper surface of the fuel tank 3c in this order. The step 3f is a step attached to a turning frame located at the front of the tool box 3a. The same applies when the worker goes down from the top of the upper turning body 3, except that the order is reversed. Further, the worker can reach the inside of the cabin 10 by using the front left step 1e-FL and the upper surface of the left crawler belt 1b-L in this order. The same applies when the worker goes down onto the ground from the cabin 10, except that the order is reversed.

The traveling hydraulic motors 1M are attached to the rear ends (−X side ends) of the frames 1a. The traveling hydraulic motors 1M include a left traveling hydraulic motor 1M-L and a right traveling hydraulic motor 1M-R (not illustrated). The left traveling hydraulic motor 1M-L is attached to the rear end of the left frame 1a-L. The left crawler belt 1b-L engages a drive sprocket coupled to the rotation shaft of the left traveling hydraulic motor 1M-L and also engages a left driven sprocket 1S-L rotatably attached to the front end of the left frame 1a-L. With the above configuration, in FIG. 10, when the traveling hydraulic motors 1M rotate counterclockwise, the crawler belts 1b also rotates counterclockwise and the shovel PS moves forward. Conversely, when the traveling hydraulic motors 1M rotate clockwise, the crawler belts 1b also rotates clockwise and the shovel PS moves backward.

Figure 12:
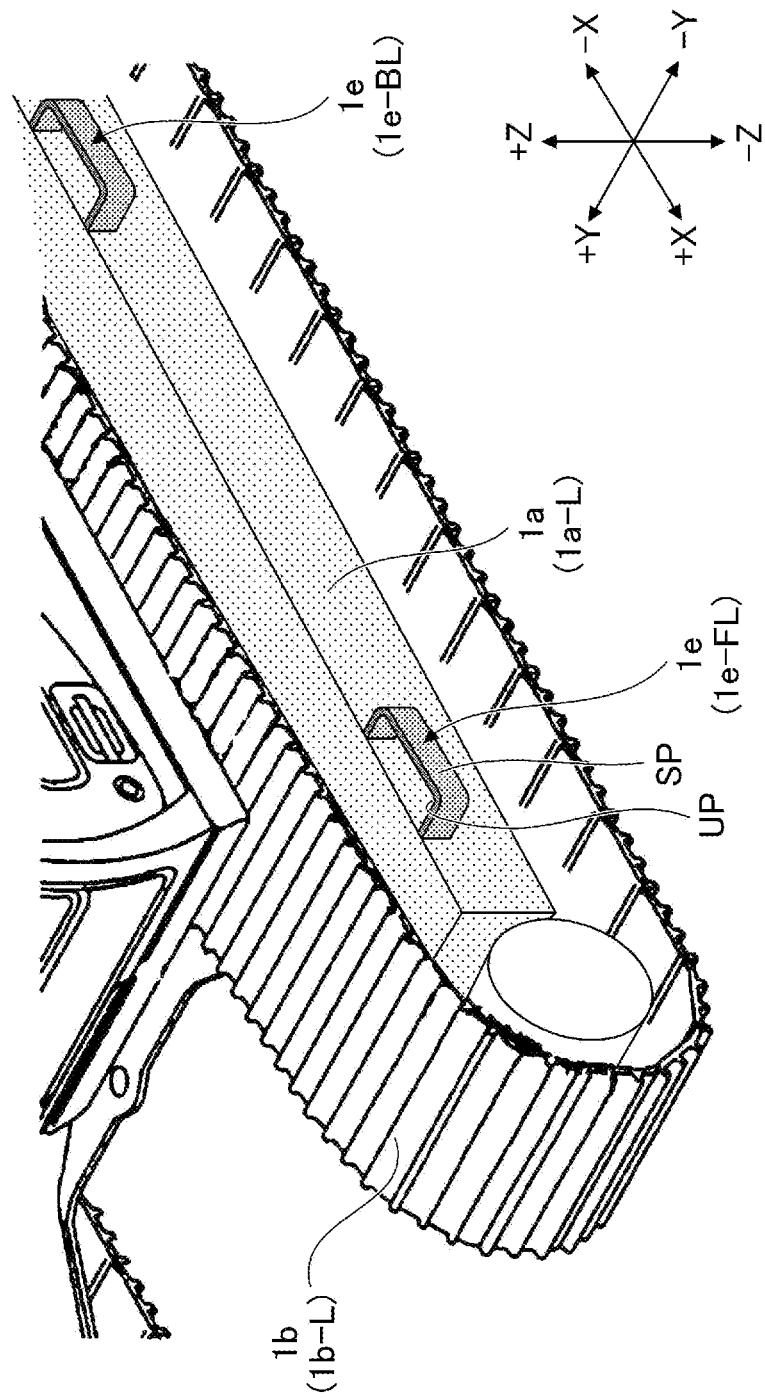
FIG. 12 is a perspective view of a lower traveling body.

Next, referring to FIG. 12, steps 1e will be described in detail. FIG. 12 is a perspective view of the lower traveling body 1 when viewed from the upper left toward obliquely downward.

In the example of FIG. 12, each of the steps 1e is formed by bending a metal plate into a U-shape, and the both ends of each of the steps 1e are welded to the corresponding frame 1a. The steps 1e may be formed by combining a plurality of metal plates. The steps 1e may be fastened to the frames 1a with bolts.

The steps 1e are painted with paint having different color properties from paint of the frame 1a, such that a worker (particularly a worker who uses the steps 1e to go down onto the ground from the lower traveling body 1) can distinguish the steps 1e from the frame 1a. The color properties are defined by three attributes that are hue, lightness, and chroma. For example, the "different color properties" means that levels of any of the attributes are different in a color system that quantitatively represents colors. For example, in the Munsell color system, hue is defined by 100 levels, lightness is defined by 11 levels, and chroma is defined by 14 levels.

The steps 1e may be painted such that the color of the steps 1e differs in any or all of hue, lightness, and chroma from the color of the frame 1a. The steps 1e may be painted with achromatic paint or may be painted with chromatic paint. The steps 1e may be painted with fluorescent paint, reflective paint, anti-reflective paint, or luminous paint, for example. The same applies to the frame 1a.

The lightness of the color of the steps 1e is desirably at a higher level than the lightness of the color of the frame 1a. The lightness of the color of the frame 1a preferably differs from the lightness of the color of the steps 1e by two or more levels, and more preferably by four or more levels.

If the lightness of the color of the frame 1a is less than or equal to a predetermined value (for example, if the lightness is "5"), the steps 1e may be painted such that the lightness of the color of the steps 1e is greater than or equal to the predetermined value (for example, the lightness is "6"). Alternatively, if the lightness of the color of the frame 1a is greater than or equal to the predetermined value (for example, if the lightness is "6"), the color of the steps 1e may be painted such that the lightness of the color of the steps 1e is less than or equal to the predetermined value (for example, the lightness is "5"). The difference in lightness makes it easier to distinguish the steps 1e from the frame 1a.

The color of the steps 1e may have the same hue as the color of the upper turning body 3, or may have a different hue from the color of the upper turning body 3. If the color of the steps 1e has the same hue as the color of the upper turning body 3, the upper turning body 3 and the steps 1e may be painted with the same paint. Namely, all of hue, lightness, and chroma of the color of the steps 1e may be the same as those of the color of the upper turning body 3.

The color of the steps 1e is desirably a highly distinctive color in hue, such as yellow or yellowish-green. The color of the steps 1e may be a complementary color of the color of the frame 1a, or may be a complementary color of the color of the upper turning body 3. The color of the steps 1e may be determined in accordance with the use environment of the shovel. The use environment of the shovel includes a scrapyard, a road, a forest area, and a mountainous area.

The color of the steps 1e includes one or both of a paint color of the side surface and a paint color of the upper surface of each of the steps 1e. Namely, the steps 1e are each painted such that one or both of the side surface and the upper surface have different color properties from those of the frame 1a. This makes it easier for a worker who goes up and down the lower traveling body 1 to find the steps 1e. The color of the side surface of each of the steps 1e may be different in any or all of hue, lightness, and chroma from the color of its upper surface. FIG. 12 illustrates that the top surface UP and the side surface SP of the front left step 1e-FL are painted in different colors.

The side surface of each of the steps 1e is basically painted in one color, but may be painted in a plurality of colors that differ in any or all of hue, lightness, and chroma from each other. For example, the side surface of each of the steps 1e may be painted in two colors, including a color visible at night and a color visible in the daytime. The same applies to the upper surface of each of the steps 1e.

The front left step 1e-FL is basically equal in color to the back left step 1e-BL, but may be painted to differ in any or all of hue, lightness, and chroma from the color of the back left step 1e-BL. Furthermore, the front left step 1e-FL and the back left step 1e-BL are basically equal in color to the front right step 1e-FR and the back right step 1e-BR, but may be painted to differ in any or all of hue, lightness, and chroma from the colors of the front right step 1e-FR and the back right step 1e-BR. With the above-described color scheme, the worker can readily identify the orientation of the lower traveling body 1.

The color of the steps 1e basically means the color of the steps 1e themselves. However, the color of the steps 1e may sometimes mean the color of a sticker affixed to each of the steps 1e or the color of a different element fixed to each of the steps 1e. The same applies to the frame 1a.

Figure 13A:
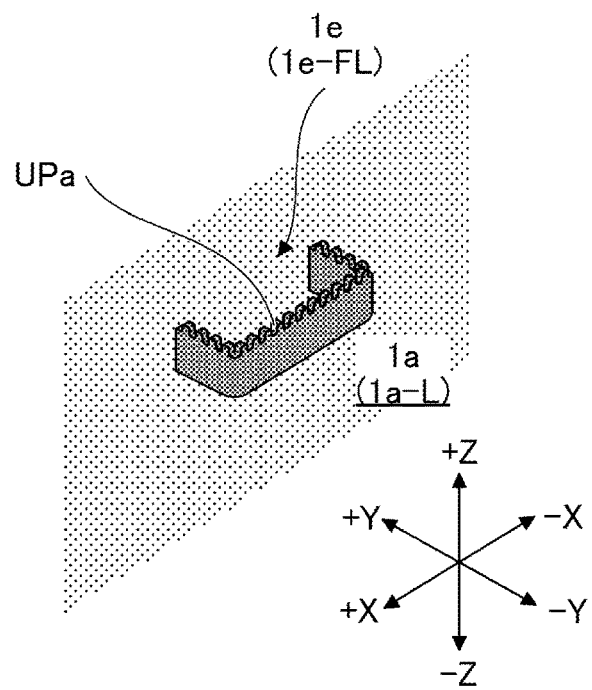
FIG. 13A is a perspective view of a step.
Figure 13B:
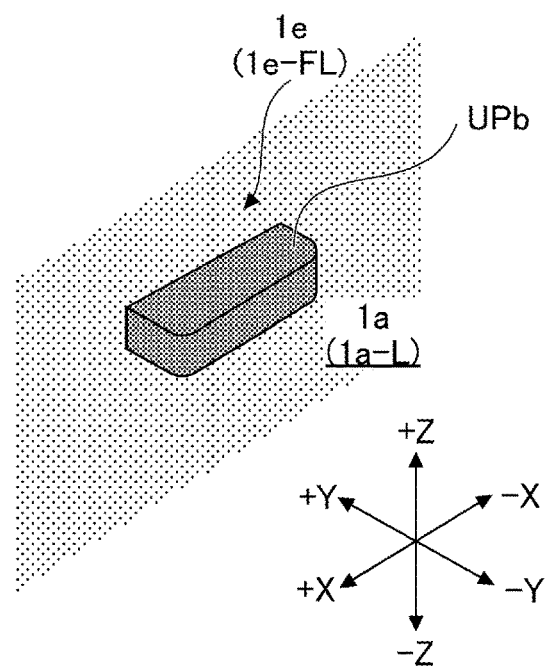
FIG. 13B is a perspective view of a step.

Next, referring to FIG. 13A and FIG. 13B, other configurations of the steps 1e will be described. FIG. 13A and FIG. 13B are perspective views of other configurations of the steps 1e. Specifically, FIG. 13A and FIG. 13B are perspective views of the front left step 1e-FL.

The front left step 1e-FL of FIG. 13A differs from the front left step 1e-FL of FIG. 12, in that the upper surface UPa has slip prevention. Specifically, the front left step 1e-FL of FIG. 13A is configured such that the upper surface UPa is a wavy surface.

The front left step 1e-FL of FIG. 13B differs from the front left step 1e-FL of FIG. 12, in that a space between the frame 1a and the front left step 1e-FL is covered by a metal plate UPb. Note that the metal plate UPb may have slip prevention, as in the example of FIG. 13A.

As described above, the shovel PS includes the steps 1e having a different color from that of the frames 1a. Accordingly, it is possible to provide the steps 1e that are readily distinguishable from the frames 1a. Further, in a case where the operator of the shovel PS exits the cabin 10 and goes down onto the ground, the operator can easily identify the steps 1e and do not miss the steps 1e.

Although the embodiments have been specifically described, the present invention is not limited to the above-described embodiments. Variations and modifications can be made to the above-described embodiments without departing from the scope of the present invention. Further, any features described with reference to the embodiments may be combined as appropriate, as long as no technical contradiction occurs.

For example, in the above-described embodiments, the terrain data projecting unit 50S enables visualization of an underground buried object in one grey color. However, the terrain data projecting unit 50S may change the color and illuminance of the underground buried object in accordance with the vertical distance to the underground buried object.

Figure 14:
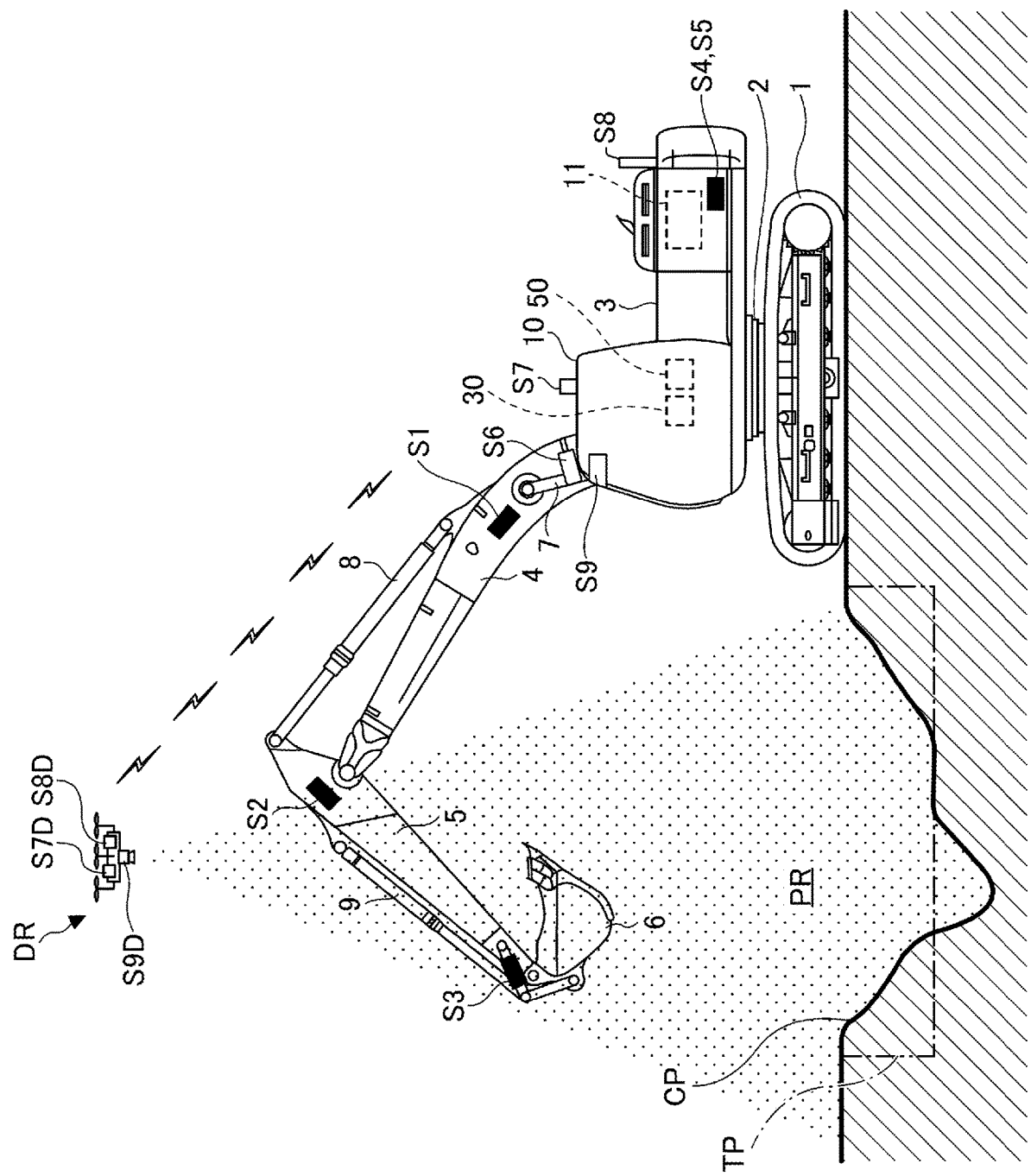
FIG. 14 is a cross-sectional side view of the ground surface where the shovel is located.

Further, in the above-described embodiments, the projection device S9 is attached to the shovel PS. However, the projection device S9 may be a projection device S9D that is attached to an aerial vehicle DR flying above the shovel PS as illustrated in FIG. 14. The aerial vehicle DR may be an autonomous aerial vehicle that can fly under remote control or under autopilot. Examples of the aerial vehicle DR include a multicopter (drone) and an airship. In the example of FIG. 14, the aerial vehicle DR is a quadcopter on which a communication device S7D, a positioning device S8D, and the projection device S9D are mounted. A dot-hatched area PR of FIG. 14 indicates a projection range of the projection device S9D.

Figure 15:
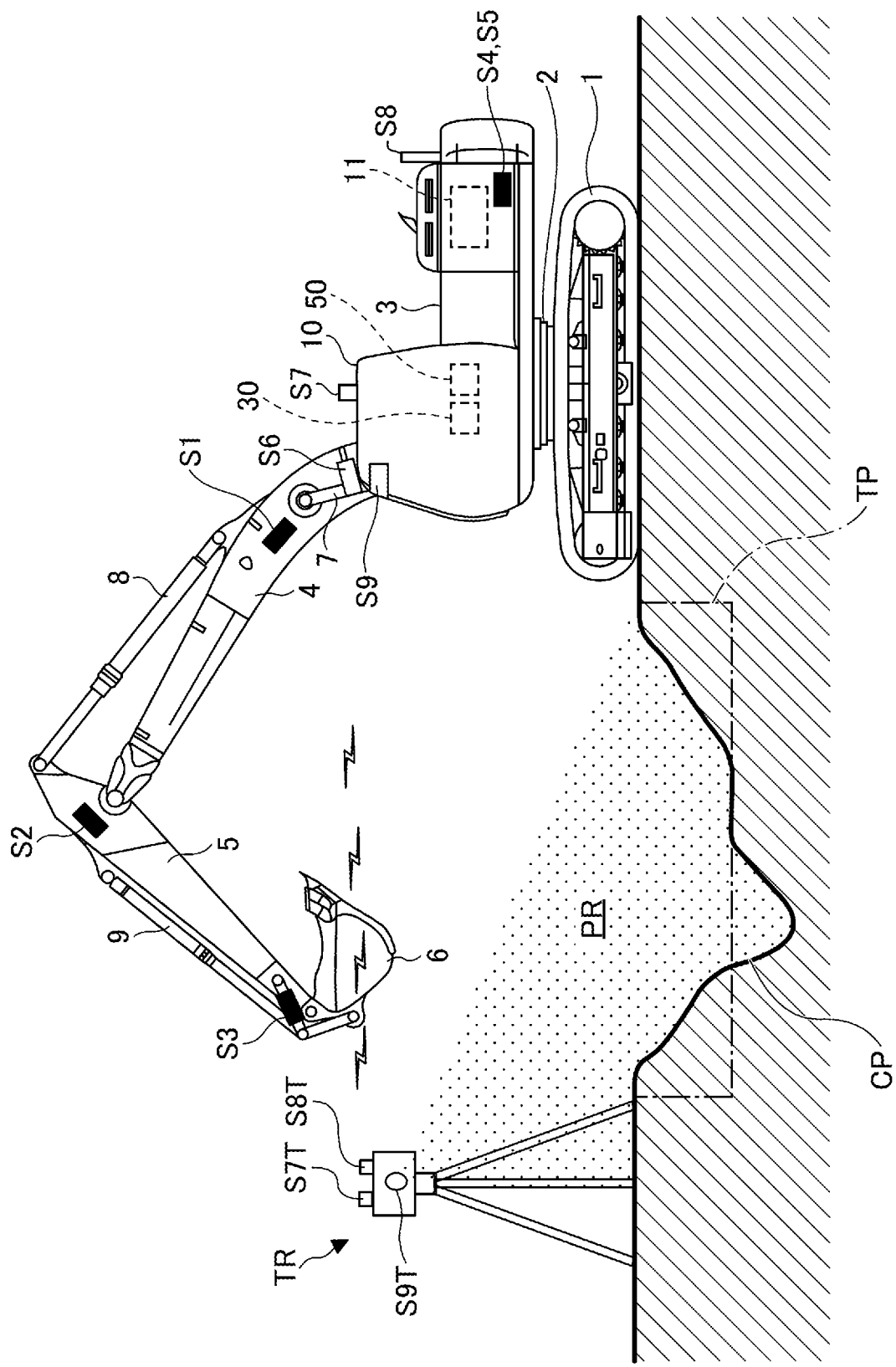
FIG. 15 is a cross-sectional side view of the ground surface where the shovel is located.

As illustrated in FIG. 15, the projection device S9 may be a projection device S9T that is attached to a support stand TR installed outside the shovel PS. The support stand TR is, for example, a column fixed to the ground or a portable tripod. In the example of FIG. 15, the support stand TR is a tripod on which a communication device S7T, a positioning device S8T, and the projection device S9T are mounted. A dot-hatched area PR of FIG. 15 indicates a projection range of the projection device S9T.

FIG. 14 and FIG. 15 illustrate examples of the projection devices S9D and S9T being installed at a location away from the shovel PS. In such cases, controllers, which control the projection devices S9D and S9T so as to change information to be visualized on the ground surface, may be provided within the projection devices S9D and S9T. Further, a communication means may be provided within each of the projection devices S9D and S9T. In this case, via the communication means, the controller of each of the projection devices S9D and S9T may receive information related to construction and information related to the operation state, from the controller 30 (control unit) provided within a construction machine such as the shovel PS. Examples of the construction machine, which may be employed in the present invention, include a shovel (hydraulic shovel), a bulldozer, and a wheel loader.

Figure 16:
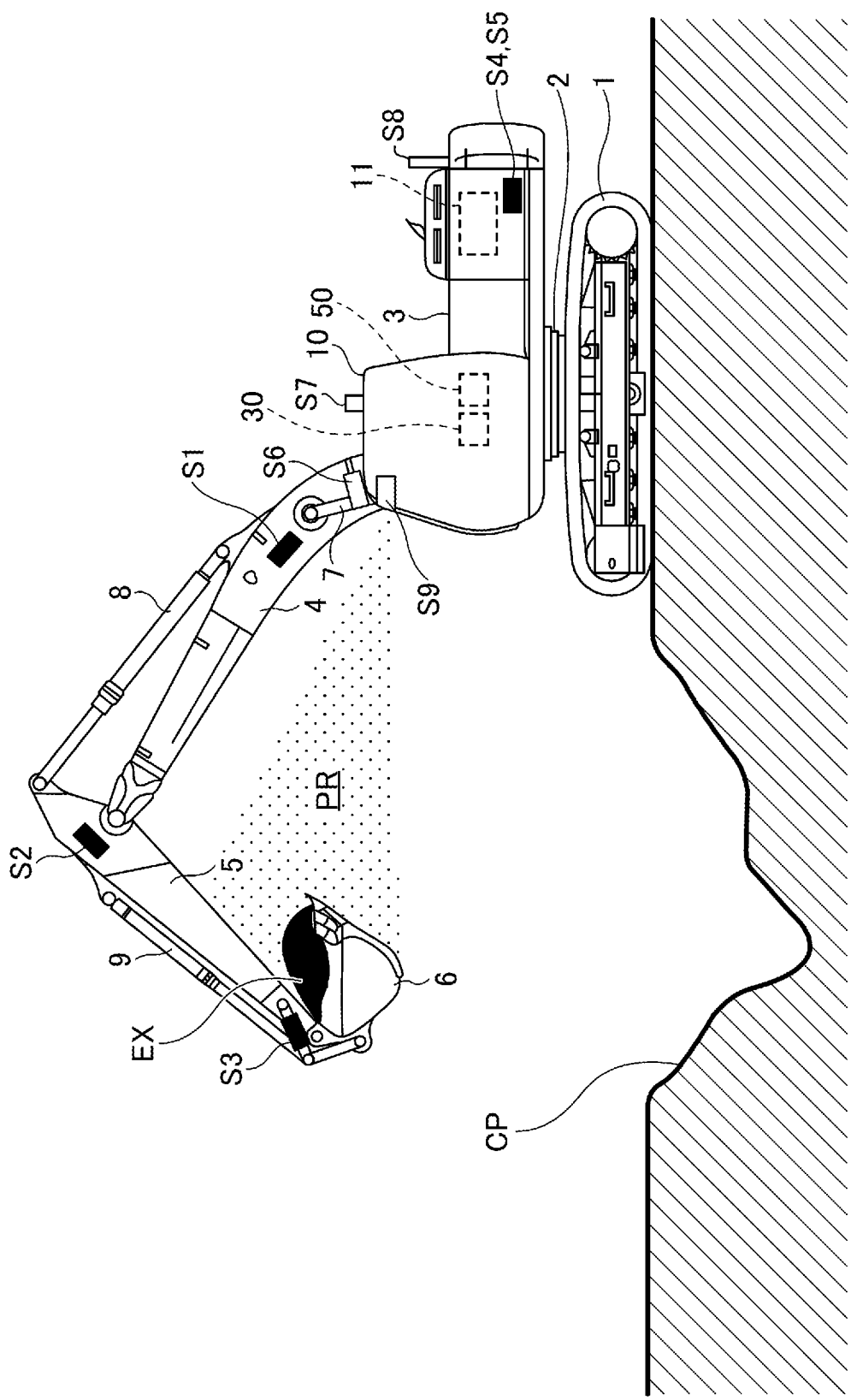
FIG. 16 is a cross-sectional side view of the ground surface where the shovel is located.
Figure 17:
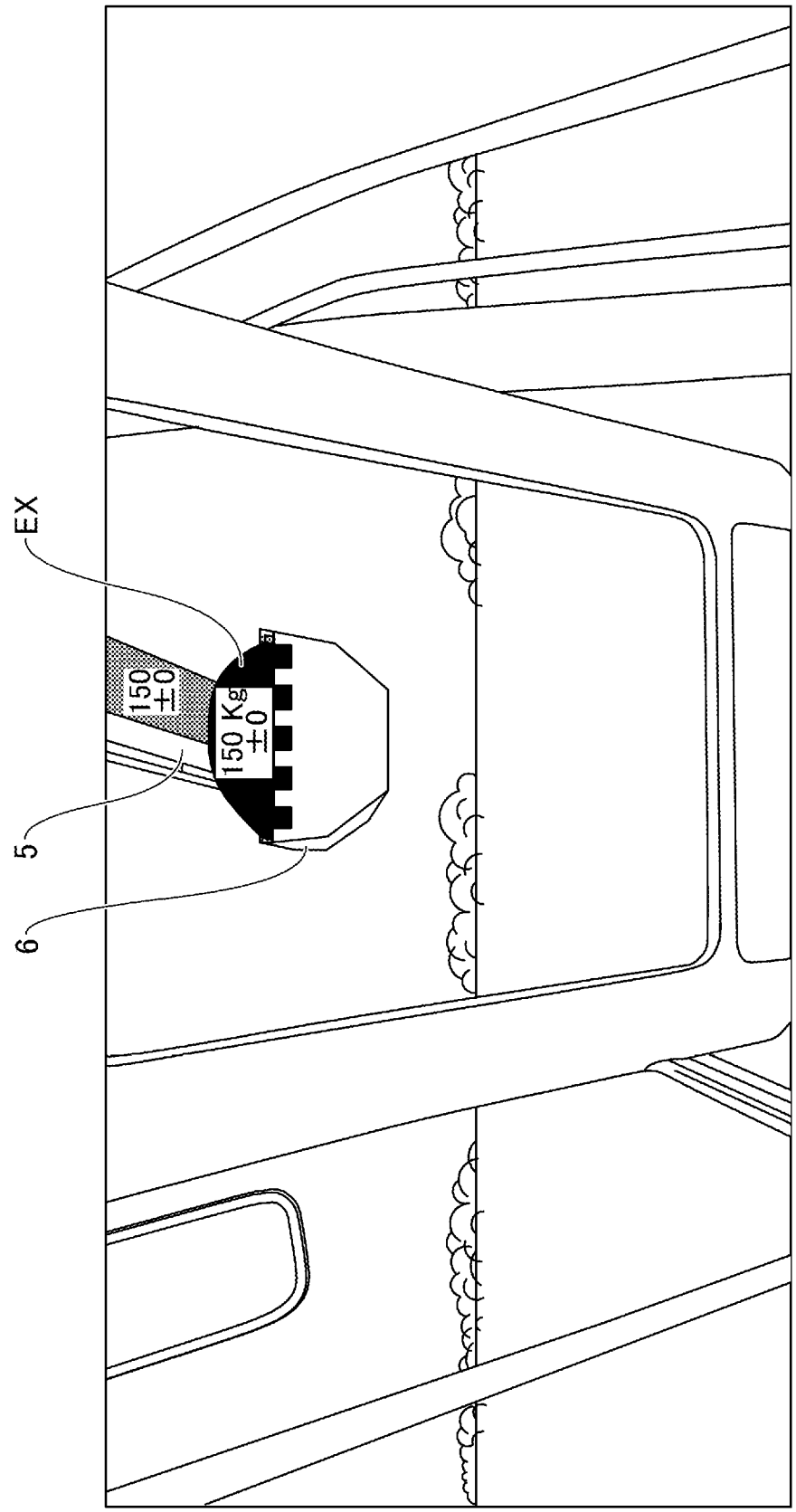
FIG. 17 is a diagram illustrating space in front of the shovel when viewed from the inside of a cabin.

The projection device S9 may be configured to project light onto an attachment. For example, as illustrated in FIG. 16, the projection device S9 may be configured to project light onto a projection surface located at the inner side of the excavation attachment. The projection surface includes any or all of the back surface of the bucket 6, the surface of excavated material EX such as soil loaded into the bucket 6, and the inner surface of the arm 5. The operator of the shovel PS can view information projected onto the projection surface by viewing the inner side of the excavation attachment from the operator's seat when moving the excavation attachment to load the excavated material EX into the bed of a dump truck. In this case, the machine guidance device 50 may change the location of the projection surface in accordance with a change in the orientation of the excavation attachment. As illustrated in FIG. 17, the information projected onto the projection surface includes one or both of the bucket load weight and the remaining load weight, for example. The bucket load weight is the weight of the excavated material EX loaded into the bucket 6. The bucket load weight may be calculated based on the load detected by each of the boom cylinder pressure sensor, the arm cylinder pressure sensor, and the bucket cylinder pressure sensor, for example. The remaining load weight is a value obtained by subtracting the weight of excavated material EX, already loaded into the bed of a dump truck, from the maximum load capacity of the dump truck. FIG. 17 illustrates an example in which the bucket load weight and the remaining load weight are projected onto the surface of excavated material EX loaded into the bucket 6 and onto the inner surface of the arm 5. Further, in the example of FIG. 17, the bucket load weight is 150 kg, and the remaining load weight is ±0 kg. The bucket load weight may be calculated when a boom rising and turning operation is being performed after excavation, and may be projected thereafter. The remaining load weight may be calculated based on the difference between the maximum load capacity of the dump truck and the cumulative bucket load weight calculated from the start of loading on a per-dump-truck basis.

Figure 18:
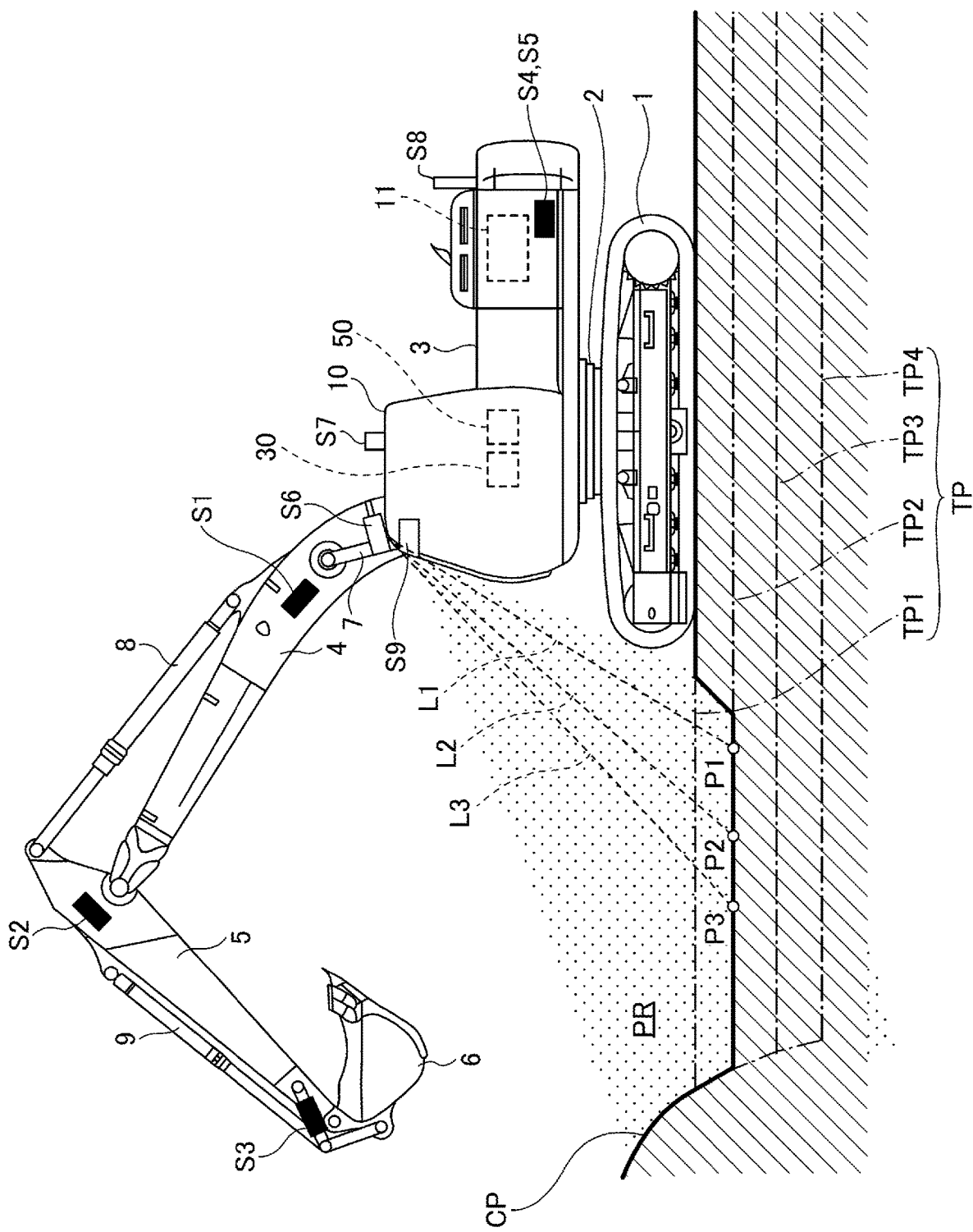
FIG. 18 is a cross-sectional side view of the ground surface where the shovel is located.

Further, the projection device S9 may be utilized to support any work other than excavation work. For example, the projection device S9 may be utilized to support road laying work as illustrated in FIG. 18. FIG. 18 is a diagram illustrating a visualization process when road laying work is performed. In the road laying work, a target surface TP is set above the current ground surface CP. In the example of FIG. 18, the road is configured to include four layers that are base course, subbase course, subgrade, and an embankment. Therefore, the target surface TP includes a target surface TP1, which is the base course, a target surface TP2, which is the subbase course, a target surface TP3, which is the subgrade, and a target surface TP4, which is the embankment. In the example of FIG. 18, embankment work for forming the target surface TP1, which is the base course, and rolling compaction work for finishing the target surface TP2, which is the subbase course, are being performed by the shovel PS. Namely, embankment work and rolling compaction work for the subgrade and for the embankment have already been completed. Points P1, P2, and P3 in FIG. 18 are points on the ground surface CP irradiated with light beams L1, L2, and L3, similar to FIG. 4. The Points P1, P2, and P3 are located on the target surface TP2. Further, a dot-hatched area PR indicates a projection range of the projection device S9.

Figure 19:
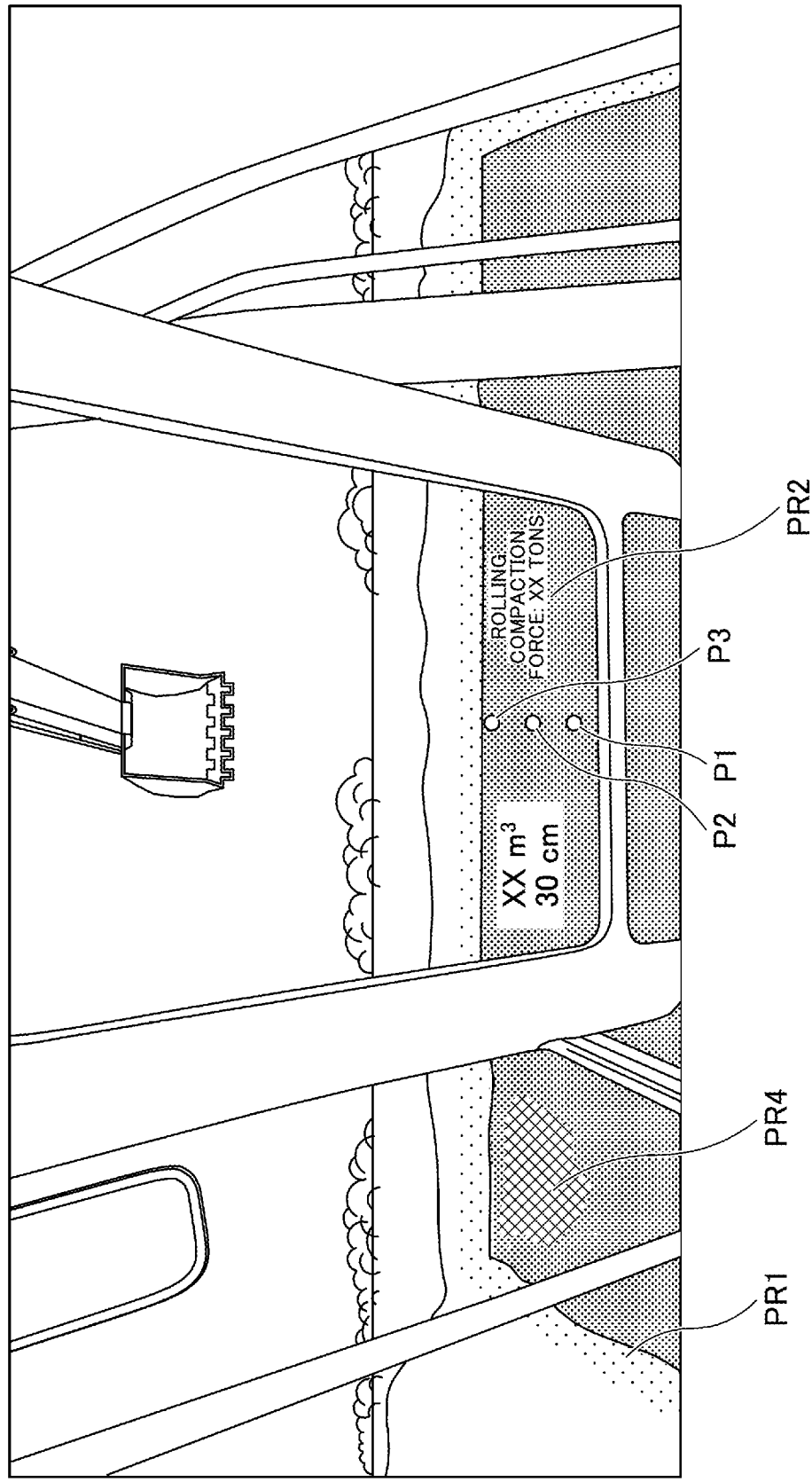
FIG. 19 is a diagram illustrating space in front of the shovel when viewed from the inside of the cabin.

In this case, information projected by the projection device S9 includes the rolling compaction force, the target thickness of a layer, and the amount of soil required to form the layer, as illustrated in FIG. 19. FIG. 19 illustrates an example in which the target thickness of the base course is 30 cm, the amount of soil required to complete the base course is "XX $m^3$", and the rolling compaction force required to form the subbase course is "XX tons". An area PR1 indicates that the current ground surface CP is higher (shallower) than the target surface TP2, which is the subbase course. An area PR2 indicates that the height of the current ground surface CP is equal to the height of the target surface TP2. Further, an area PR4 indicates an area of the subbase course where rolling compaction is insufficient. The machine guidance device 50 can indicate, to the operator, not only a value of the rolling compaction force required to form the subbase course, but also an area where rolling compaction is insufficient. Further, the machine guidance device 50 may also indicate, to the operator, that embankment work for the base course should be started upon the completion of rolling compaction work for the subbase course (for example, upon the completion of elimination of an area where rolling compaction is insufficient). Alternatively, if reinforcement materials such as logs are buried in the ground for road reinforcement, the machine guidance device 50 may be configured to use the projection device S9 to project burying positions onto the ground surface. As described, the machine guidance device 50 can project useful information different for each work onto the ground. The useful information different for each work includes one or both of instruction information and numerical information that change in accordance with the progress of work.

Figure 20:
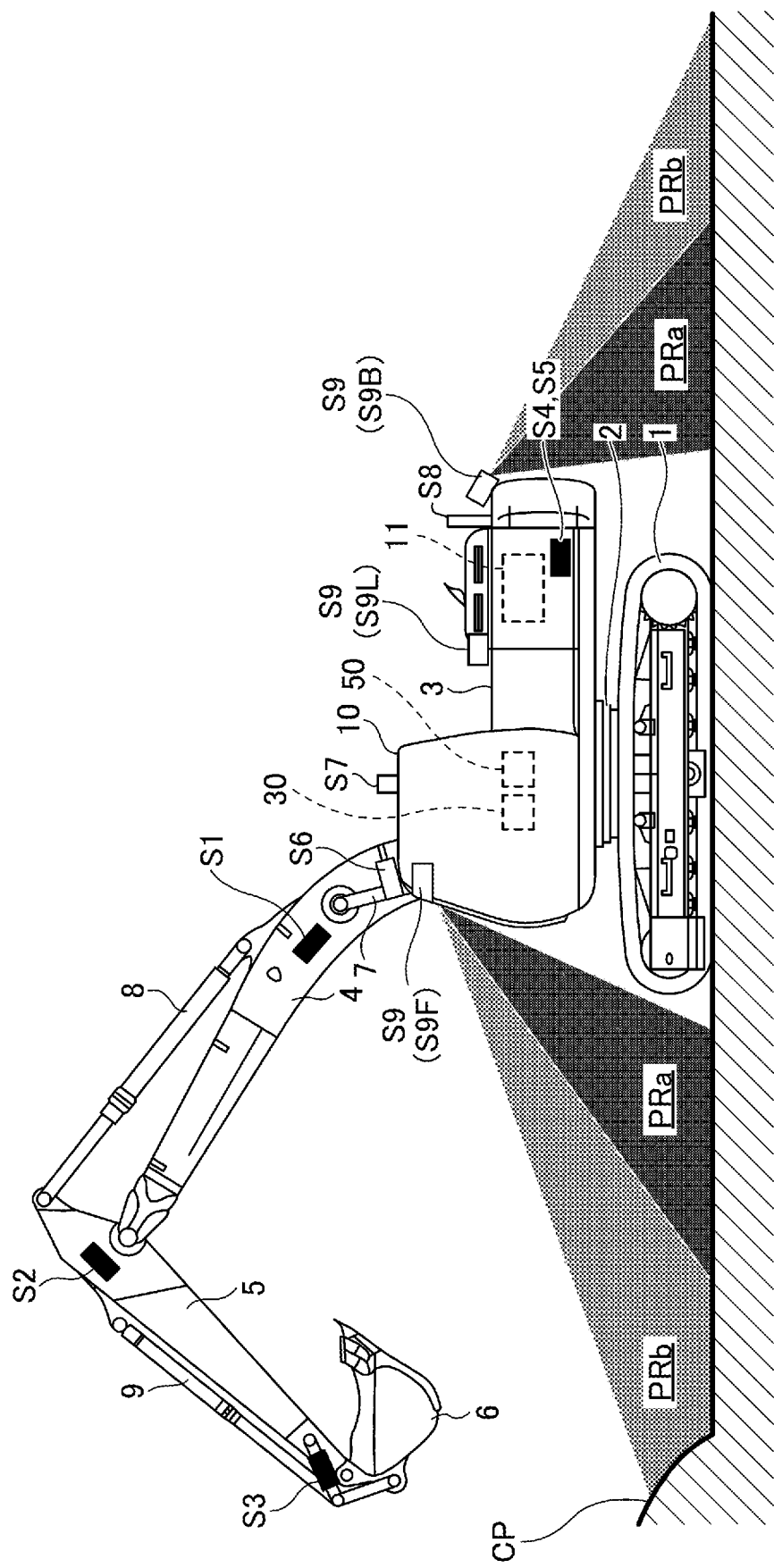
FIG. 20 is a side view of the shovel.
Figure 21:
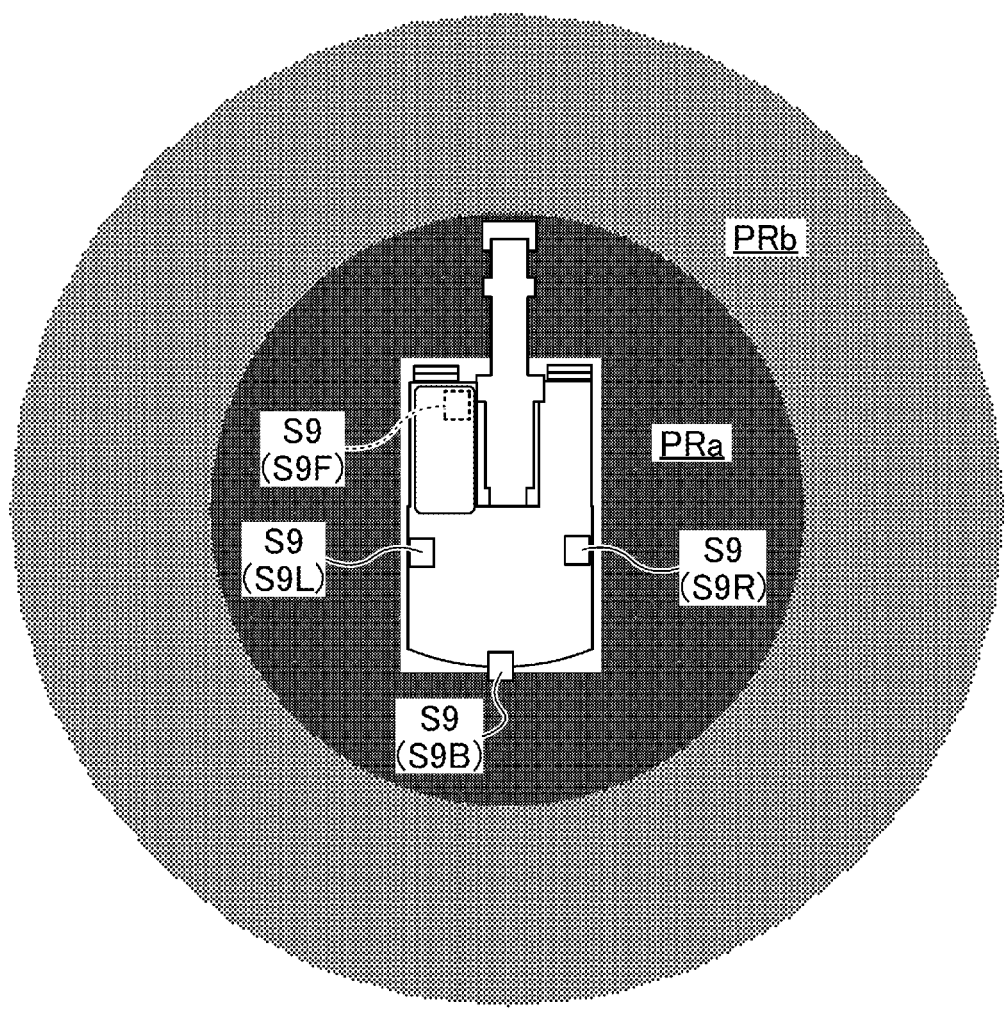
FIG. 21 is a top view of the shovel.

In addition to projecting light in front of the shovel PS, the projection device S9 may project light in a plurality of directions, such as projecting light towards the sides of the shovel PS and projecting light behind the shovel PS. As illustrated in FIG. 20 and FIG. 21, for example, projection devices S9 may include a front projection device S9F, a left projection device S9L, a right projection device S9R, and a rear projection device S9B. The projection devices S9 may irradiate the ground surface with light, such that a worker who works in the vicinity of the shovel PS can distinguish between a prohibited area located within a first distance from the shovel, a caution area located within a second distance from the shovel, which is longer than the first distance from the shovel, and a work area located outside of the caution area.

In each of FIG. 20 and FIG. 21, a dark textured pattern indicates a prohibited area PRa and a light textured pattern indicates a caution area PRb. The work area corresponds to an area outside of the caution area PRb. In each of FIG. 20 and FIG. 21, each of a first distance and a second distance are a distance from the turning axis. However, each of the first distance and the second distance may be a distance from the side of the upper turning body 3, for example. In each of FIG. 20 and FIG. 21, the prohibited area PRa is irradiated with a red light beam, and the caution area PRb is irradiated with a green light beam, and the work area is not irradiated. The caution area PRb may be irradiated with a yellow light beam. For example, when the engine 11 is turned on, the projection device S9 may be configured to irradiate the prohibited area PRa and the caution area PRb. Accordingly, even if a worker cannot hear the sound of the engine due to ambient noise, the work readily recognizes the degree to which the shovel PS approaches. Note that the projection device S9 may be configured to irradiate the prohibited area PRa and the caution area PRb when the gate lock valve D6 is opened. In addition, the projection device S9 may be configured to project, onto the ground surface, character information or graphic information indicating that the shovel PS is in operation.

Figure 22:
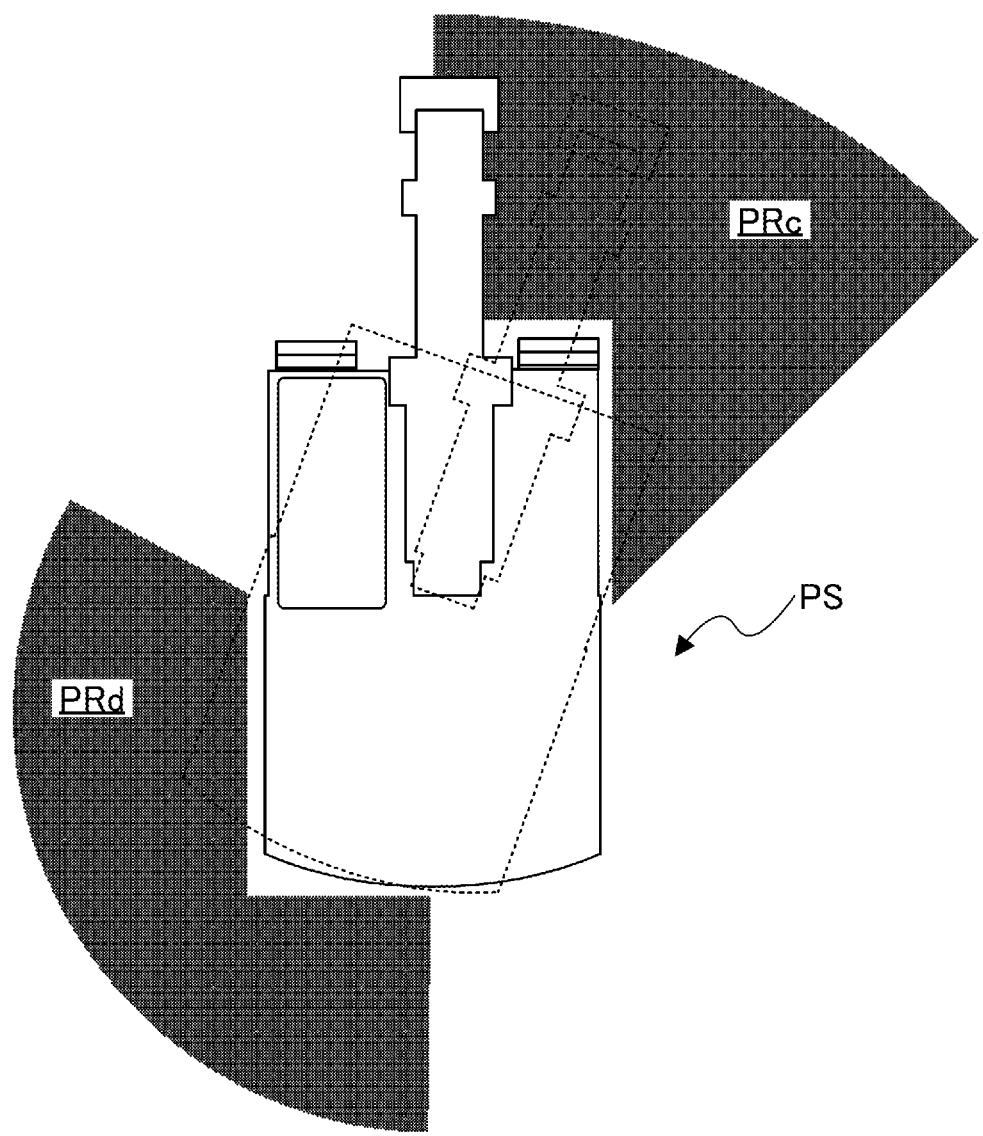
FIG. 22 is a top view of the shovel.

The projection device S9 may be configured to emit light onto a predetermined area of the ground surface in the vicinity of the shovel PS, in accordance with the operation of the operation device 26. For example, as illustrated in FIG. 22, the projection device S9 may be configured to irradiate a right front area PRc and a left rear area PRd with light of a predetermined color, when a turning operation lever is operated to cause the upper turning body 3 to turn to the right. The right front area PRc is an area where there may be an object that makes contact with the excavation attachment when a turning-right operation is performed. The left rear area PRd is an area where there may be an object that makes contact with a counter weight when the turning-right operation is performed. A dash line of FIG. 22 indicates that the upper turning body 3 is turning to the right. Further, the size of the right front area PRc may be configured to change in accordance with changes in the orientation of the excavation attachment and the inclination angle of the turning operation lever. The same applies to the left rear area PRd.

Figure 23:
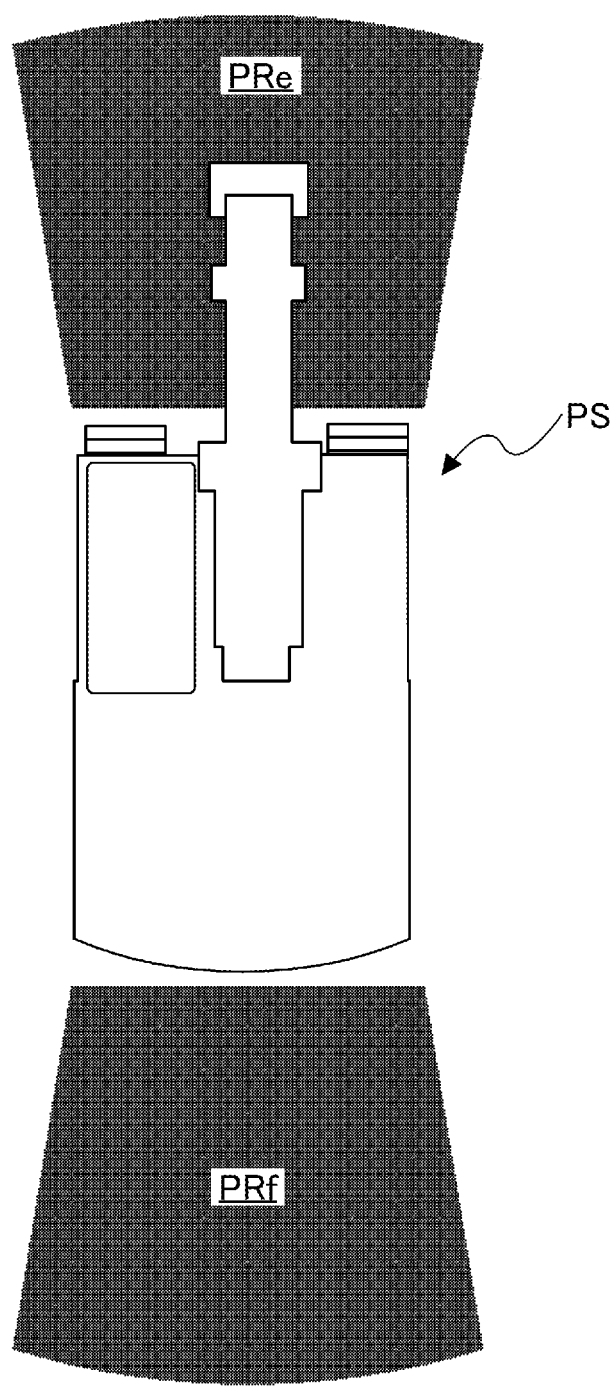
FIG. 23 is a top view of the shovel.

The projection device S9 may be configured to emit light onto the ground surfaces in front of and behind the lower traveling body 1 while the shovel PS is moving. For example, as illustrated in FIG. 23, the projection device S9 may be configured to irradiate a front area PRe and a rear area PRf with light, in accordance with the operation of a traveling lever. The front area PRe is an area where there may be an object that makes contact with the lower traveling body 1 when a moving-forward operation is performed. The rear area PRf is an area where there may be an object that makes contact with the lower traveling body 1 when a moving-backward operation is performed. The projection device S9 may be configured to irradiate the rear area PRf with light only when the moving-backward operation is performed. Further, the size of the front area PRe may be configured to change in accordance with a change in the inclination angle of the traveling lever. The same applies to the rear area PRf. Note that the rear projection device S9B and the front projection device S9F constituting the projection devices S9 may be connected in series in an electric circuit. In this case, the operator of the shovel PS can check whether the rear projection device S9B is operating properly by visually checking light projected by the front projection device S9F. This is because, if the electric circuit is interrupted by the rear projection device S9B, the front projection device S9F is unable to project light.

What is claimed is:

1. A work support system for a construction machine including an upper turning body and an attachment attached to the upper turning body, the work support system comprising:
    a hardware processor; and
    a projector configured to constantly emit light over a fixed distance from the upper turning body in a plurality of directions regardless of a pose of the attachment based on a signal from the hardware processor, the light visualizing information on a ground surface in a vicinity of the construction machine, the plurality of directions including at least one of a direction toward an area to a side of the construction machine or a direction toward an area behind the construction machine,
    wherein the projector is configured to emit the light onto the ground surface to irradiate a prohibited area and a caution area with a first light beam and a second light beam, respectively, the first light beam and the second light beam having different colors, the prohibited area being located within a first distance from the construction machine, the caution area being located between the first distance and a second distance from the construction machine, the second distance being longer than the first distance.

2. The work support system as claimed in claim 1, wherein the projector is configured to project character information or graphic information indicating that the construction machine is in operation onto the ground surface.

3. The work support system as claimed in claim 1, wherein the projector is configured to emit the light when the construction machine is in operation.

4. The work support system as claimed in claim 1, wherein the projector is configured to emit the light onto a predetermined area of the ground surface in the vicinity of the construction machine in accordance with an operation.

5. The work support system as claimed in claim 1, wherein the projector is configured to change a predetermined area of the ground surface to irradiate with the light in the vicinity of the construction machine in accordance with an orientation of the attachment.

6. The work support system as claimed in claim 1, wherein the projector is configured to change a predetermined area of the ground surface to irradiate with the light in the vicinity of the construction machine in accordance with an inclination angle of an operation lever.

7. The work support system as claimed in claim 1, wherein the projector includes a plurality of projectors that are connected in series in an electric circuit.

8. The work support system as claimed in claim 1, wherein the projector is configured to constantly emit the light over the fixed distance while an engine of the construction machine is turned on or an operation device of the construction machine for operating the construction machine is enabled.

9. The work support system as claimed in claim 1, wherein the projector is configured to emit the light onto a right front area and a left rear area of the construction machine when the upper turning body turns right.

10. A work support system for a construction machine, comprising:
- a hardware processor; and
- a plurality of projectors configured to emit light over a fixed distance from an upper turning body of the construction machine in a plurality of directions based on a signal from the hardware processor, the light visualizing information on a ground surface in a vicinity of the construction machine, the plurality of directions including a direction toward an area to a left side of the construction machine, a direction toward an area behind the construction machine, a direction toward an area in front of the construction machine, and a direction toward an area to a right side of the construction machine,
- wherein the plurality of projectors are configured to emit the light onto the ground surface to irradiate a prohibited area and a caution area entirely around the construction machine, the prohibited area being located within a first distance from the construction machine, the caution area being located between the first distance and a second distance from the construction machine, the second distance being longer than the first distance.

* * * * *